US006969441B2

(12) United States Patent
Welch et al.

(10) Patent No.: US 6,969,441 B2
(45) Date of Patent: Nov. 29, 2005

(54) METHOD AND APPARATUS FOR PRODUCING LAMINATED ARTICLES

(75) Inventors: Howard M. Welch, Woodstock, GA (US); Charles J. Morell, Roswell, GA (US); Michael C. Cook, Marietta, GA (US); James R. Fitts, Jr., Gainesville, GA (US); Donald V. Willitts, Douglasville, GA (US); Marion C. Morris, Appleton, WI (US); Ronald H. Wideman, Menasha, WI (US); John A. Brewer, LaGrange, GA (US); Mark M. Mleziva, Appleton, WI (US); Kenneth M. Salter, Marietta, GA (US); Raymond J. May, Norcross, GA (US); Lavada Boggs, Marietta, GA (US); Leslie D. Dobbins, Marietta, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

(21) Appl. No.: 09/855,169

(22) Filed: May 14, 2001

(65) Prior Publication Data

US 2002/0104608 A1 Aug. 8, 2002

Related U.S. Application Data

(60) Provisional application No. 60/204,307, filed on May 15, 2000.

(51) Int. Cl.$^7$ .......................... B32B 31/00; A61F 13/15
(52) U.S. Cl. ....................... 156/161; 156/163; 156/164; 156/167; 156/229; 156/494; 156/495; 156/500
(58) Field of Search ................................. 156/500, 160, 156/161, 163, 164, 229, 494, 495, 167

(56) References Cited

U.S. PATENT DOCUMENTS 369,871 A * 9/1887 Ditzler ........................ 63/18

| | | |
|---|---|---|
| 2,206,761 A | 7/1940 | Bergstein |
| 2,266,761 A | 12/1941 | Jackson, Jr. et al. |
| 2,357,392 A | 9/1944 | Francis, Jr. |
| 2,464,301 A | 3/1949 | Francis, Jr. |

(Continued)

FOREIGN PATENT DOCUMENTS

CA    2157757 A1    2/1995

(Continued)

OTHER PUBLICATIONS

Publication: "Superfine Thermoplastic Fibers" by Van A. Wente, Naval Research Laboratory, Washington, D.C.; pp. 1342–1346 in Industrial and Engineering Chemistry.

Publication: "Manufacture of Superfine Organic Fibers" by V.A. Wente, E.L. Boone, and C.D. Fluharty in Chemistry Division, Naval Research Laboratory, Washington, D.C.; May 25, 1954; pp. 1–15.

Primary Examiner—Jeff H. Aftergut
(74) Attorney, Agent, or Firm—Dority & Manning, P.A.

(57) ABSTRACT

In the invention, a method is provided for producing a composite nonwoven fabric. A polymer is extruded into heated continuous filaments, possibly elastic, from the die head to a first chilled roller, wherein the extruder is configured to provide the continuous filaments to the chilled roller in a canted direction that is at a tangent or angle to the surface of the first chilled roller. The filaments are conveyed in a downward direction by way of chilled rollers to a nip. In a next step, the nonwoven web is sprayed with an adhesive and is laminated on the continuous filaments in the nip to form a composite nonwoven fabric. The continuous filaments move vertically downward approximately in line with the lamination process, facilitating automatic re-threading of filaments when they are broken or interrupted in their travel downward onto the chilled rolls.

17 Claims, 15 Drawing Sheets

U.S. PATENT DOCUMENTS

| | | | |
|---|---|---|---|
| 2,483,405 A | 10/1949 | Francis, Jr. | |
| 2,957,512 A | 10/1960 | Wade et al. | |
| 2,957,852 A | 10/1960 | Frankenburg et al. | |
| 3,186,893 A | 6/1965 | Mercer | |
| 3,231,167 A | 1/1966 | Heuvelmans | |
| 3,245,624 A | 4/1966 | Meyers et al. | |
| 3,371,668 A | 3/1968 | Johnson | |
| 3,391,048 A | 7/1968 | Dyer et al. | |
| 3,439,085 A | 4/1969 | Hartmann | |
| 3,449,187 A | 6/1969 | Bobkowicz | |
| 3,468,748 A | 9/1969 | Bassett | |
| 3,575,782 A | 4/1971 | Hansen | |
| 3,616,129 A | 10/1971 | Sager | |
| 3,629,047 A | 12/1971 | Davison | |
| 3,669,823 A | 6/1972 | Wood | |
| 3,673,026 A | 6/1972 | Brown | |
| 3,676,242 A | 7/1972 | Prentice | |
| 3,689,342 A | 9/1972 | Vogt et al. | |
| 3,752,613 A | 8/1973 | Vogt et al. | |
| 3,773,590 A | 11/1973 | Morgan | |
| 3,802,817 A | 4/1974 | Matsuki et al. | |
| 3,806,289 A | 4/1974 | Schwarz | |
| 3,807,270 A * | 4/1974 | Wirz ............................ | 57/22 |
| 3,836,416 A | 9/1974 | Ropiequet | |
| 3,849,241 A | 11/1974 | Butin et al. | |
| 3,855,045 A | 12/1974 | Brock | |
| 3,890,184 A | 6/1975 | Morgan | |
| 3,912,567 A | 10/1975 | Swartz | |
| 3,949,130 A | 4/1976 | Sabee et al. | |
| 3,978,185 A | 8/1976 | Buntin et al. | |
| 4,013,816 A | 3/1977 | Sabee et al. | |
| 4,041,203 A | 8/1977 | Brock et al. | |
| 4,081,301 A | 3/1978 | Buell | |
| 4,090,385 A | 5/1978 | Packard | |
| 4,107,364 A | 8/1978 | Sisson | |
| 4,166,089 A * | 8/1979 | De Geest et al. ........... | 264/466 |
| 4,209,563 A | 6/1980 | Sisson | |
| 4,211,807 A | 7/1980 | Yazawa et al. | |
| 4,223,063 A | 9/1980 | Sabee | |
| 4,239,578 A | 12/1980 | Gore | |
| 4,259,220 A | 3/1981 | Bunnelle et al. | |
| 4,302,495 A | 11/1981 | Marra | |
| 4,303,571 A | 12/1981 | Jansen et al. | |
| 4,304,234 A | 12/1981 | Hartmann | |
| 4,310,594 A | 1/1982 | Yamazaki et al. | |
| 4,319,572 A | 3/1982 | Widlund et al. | |
| 4,323,534 A | 4/1982 | DesMarais | |
| 4,325,372 A | 4/1982 | Teed | |
| 4,333,782 A | 6/1982 | Pieniak | |
| 4,375,446 A | 3/1983 | Fujii et al. | |
| 4,405,397 A | 9/1983 | Teed | |
| 4,413,623 A | 11/1983 | Pieniak | |
| 4,417,935 A | 11/1983 | Spencer | |
| 4,418,123 A | 11/1983 | Bunnelle et al. | |
| 4,430,086 A | 2/1984 | Repke | |
| 4,440,819 A | 4/1984 | Rosser et al. | |
| 4,450,026 A | 5/1984 | Pieniak et al. | |
| 4,490,427 A | 12/1984 | Grant et al. | |
| 4,496,417 A | 1/1985 | Haake et al. | |
| 4,507,163 A | 3/1985 | Menard | |
| 4,525,407 A | 6/1985 | Ness | |
| 4,543,099 A | 9/1985 | Bunnelle et al. | |
| 4,548,859 A | 10/1985 | Kline et al. | |
| 4,552,795 A | 11/1985 | Hansen et al. | |
| 4,552,802 A | 11/1985 | Mechin | |
| 4,555,811 A | 12/1985 | Shimalla | |
| 4,572,752 A | 2/1986 | Jensen et al. | |
| 4,586,199 A | 5/1986 | Birring | |
| D284,036 S | 6/1986 | Birring | |
| 4,606,964 A | 8/1986 | Wideman | |
| 4,626,305 A | 12/1986 | Suzuki et al. | |
| 4,636,419 A | 1/1987 | Madsen et al. | |
| 4,640,859 A | 2/1987 | Hansen et al. | |
| 4,646,362 A | 3/1987 | Heran et al. | |
| 4,652,487 A | 3/1987 | Morman | |
| 4,656,081 A | 4/1987 | Ando et al. | |
| 4,657,793 A | 4/1987 | Fisher | |
| 4,657,802 A | 4/1987 | Morman | |
| 4,663,220 A | 5/1987 | Wisneski et al. | |
| 4,666,542 A | 5/1987 | De Jonckheere | |
| 4,675,068 A | 6/1987 | Lundmark | |
| 4,680,213 A | 7/1987 | Fourezon | |
| 4,683,877 A | 8/1987 | Ersfeld et al. | |
| 4,687,477 A | 8/1987 | Suzuki et al. | |
| 4,692,368 A | 9/1987 | Taylor et al. | |
| 4,692,371 A | 9/1987 | Morman et al. | |
| 4,718,901 A | 1/1988 | Singheimer | |
| 4,719,261 A * | 1/1988 | Bunnelle et al. ......... | 156/244.11 |
| 4,720,415 A | 1/1988 | Vander Wielen et al. | |
| 4,725,468 A | 2/1988 | McIntyre | |
| 4,734,311 A | 3/1988 | Sokolowski | |
| 4,735,673 A | 4/1988 | Piron | |
| 4,756,942 A | 7/1988 | Aichele | |
| 4,761,198 A | 8/1988 | Salerno | |
| 4,762,582 A | 8/1988 | De Jonckheere | |
| 4,775,579 A | 10/1988 | Hagy et al. | |
| 4,777,080 A | 10/1988 | Harris, Jr. et al. | |
| 4,789,699 A | 12/1988 | Kieffer et al. | |
| 4,801,345 A | 1/1989 | Dussaud et al. | |
| 4,801,482 A | 1/1989 | Goggans et al. | |
| 4,803,117 A | 2/1989 | Daponte | |
| 4,804,577 A | 2/1989 | Hazelton et al. | |
| 4,816,094 A * | 3/1989 | Pomplun et al. ......... | 156/244.24 |
| 4,826,415 A | 5/1989 | Mende | |
| 4,842,666 A | 6/1989 | Werenicz | |
| 4,854,985 A | 8/1989 | Soderlund et al. | |
| 4,854,989 A | 8/1989 | Singheimer | |
| 4,863,779 A | 9/1989 | Daponte | |
| 4,874,447 A | 10/1989 | Hazelton et al. | |
| 4,880,420 A | 11/1989 | Pomparelli | |
| 4,883,482 A | 11/1989 | Gandrez et al. | |
| 4,883,549 A | 11/1989 | Frost et al. | |
| 4,891,258 A | 1/1990 | Fahrenkrug | |
| 4,892,536 A | 1/1990 | De Marais et al. | |
| 4,892,903 A | 1/1990 | Himes | |
| 4,900,619 A | 2/1990 | Ostrowski et al. | |
| 4,906,507 A | 3/1990 | Grynaeus et al. | |
| 4,908,247 A | 3/1990 | Baird et al. | |
| 4,910,064 A | 3/1990 | Sabee | |
| 4,917,696 A | 4/1990 | De Jonckheere | |
| 4,917,746 A | 4/1990 | Kons et al. | |
| 4,929,492 A | 5/1990 | Carey, Jr. et al. | |
| 4,938,821 A | 7/1990 | Soderlund et al. | |
| 4,968,313 A | 11/1990 | Sabee | |
| 4,970,259 A | 11/1990 | Mitchell et al. | |
| 4,977,011 A | 12/1990 | Smith | |
| 4,984,584 A | 1/1991 | Hansen et al. | |
| 4,995,928 A | 2/1991 | Sabee | |
| 4,998,929 A | 3/1991 | Bjorksund et al. | |
| 5,000,806 A | 3/1991 | Merkatoris et al. | |
| 5,002,815 A | 3/1991 | Yamanaka et al. | |
| 5,060,349 A | 10/1991 | Walton et al. | |
| 5,073,436 A | 12/1991 | Antonacci et al. | |
| 5,093,422 A | 3/1992 | Himes | |
| 5,100,435 A | 3/1992 | Onwumere | |
| 5,114,087 A | 5/1992 | Fisher et al. | |
| 5,143,968 A | 9/1992 | Diehl et al. | |
| 5,147,487 A | 9/1992 | Nomura et al. | |
| D331,627 S | 12/1992 | Igaue et al. | |
| 5,169,706 A | 12/1992 | Collier, IV et al. | |

| | | |
|---|---|---|
| 5,169,712 A | 12/1992 | Tapp |
| 5,186,779 A | 2/1993 | Tubbs |
| 5,198,281 A | 3/1993 | Muzzy et al. |
| 5,200,246 A | 4/1993 | Sabee |
| D335,707 S | 5/1993 | Igaue et al. |
| 5,209,801 A | 5/1993 | Smith |
| 5,219,633 A | 6/1993 | Sabee |
| 5,226,992 A | 7/1993 | Morman |
| 5,229,191 A | 7/1993 | Austin |
| 5,230,701 A | 7/1993 | Meyer et al. |
| 5,232,777 A | 8/1993 | Sipinen et al. |
| 5,236,430 A | 8/1993 | Bridges |
| 5,236,770 A | 8/1993 | Assent et al. |
| 5,238,733 A | 8/1993 | Joseph et al. |
| 5,246,433 A | 9/1993 | Hasse et al. |
| D340,283 S | 10/1993 | Igaue et al. |
| 5,259,902 A | 11/1993 | Muckenfuhs |
| 5,260,126 A | 11/1993 | Collier, IV et al. |
| 5,266,394 A | 11/1993 | Diehl et al. |
| 5,288,791 A | 2/1994 | Collier, IV et al. |
| 5,296,080 A | 3/1994 | Merkatoris et al. |
| 5,304,599 A | 4/1994 | Himes |
| 5,308,345 A | 5/1994 | Herrin |
| 5,312,500 A | 5/1994 | Kurihara et al. |
| 5,324,580 A | 6/1994 | Allan et al. |
| 5,332,613 A | 7/1994 | Taylor et al. |
| 5,334,437 A | 8/1994 | Zafiroglu |
| 5,334,446 A | 8/1994 | Quantrille et al. |
| 5,336,545 A | 8/1994 | Morman |
| 5,342,469 A | 8/1994 | Bodford et al. |
| 5,360,854 A | 11/1994 | Bozich, Jr. |
| 5,366,793 A | 11/1994 | Fitts, Jr. et al. |
| 5,376,198 A | 12/1994 | Fahrenkrug et al. |
| 5,385,775 A | 1/1995 | Wright |
| 5,389,173 A | 2/1995 | Merkatoris et al. |
| 5,393,599 A | 2/1995 | Quantrille et al. |
| 5,405,682 A | 4/1995 | Shawyer et al. |
| 5,407,507 A | 4/1995 | Ball |
| 5,411,618 A | 5/1995 | Jocewicz, Jr. |
| 5,413,654 A | 5/1995 | Igaue et al. |
| 5,413,849 A | 5/1995 | Austin et al. |
| 5,415,649 A | 5/1995 | Watanabe et al. |
| 5,415,925 A | 5/1995 | Austin et al. |
| 5,425,987 A | 6/1995 | Shawver et al. |
| 5,429,694 A | 7/1995 | Hermann |
| 5,431,644 A | 7/1995 | Sipinen et al. |
| 5,431,991 A | 7/1995 | Quantrille et al. |
| 5,447,462 A | 9/1995 | Smith et al. |
| 5,447,508 A | 9/1995 | Numano et al. |
| 5,449,353 A | 9/1995 | Watanabe et al. |
| 5,464,401 A | 11/1995 | Hasse et al. |
| 5,470,639 A | 11/1995 | Gessner et al. |
| 5,472,775 A | 12/1995 | Obijeski et al. |
| 5,476,563 A | 12/1995 | Nahata |
| 5,484,645 A | 1/1996 | Lickfield et al. |
| 5,498,468 A | 3/1996 | Blaney |
| 5,500,075 A | 3/1996 | Herrmann |
| 5,514,470 A | 5/1996 | Haffner et al. |
| 5,523,146 A | 6/1996 | Bodford et al. |
| 5,531,850 A | 7/1996 | Herrmann |
| 5,534,330 A | 7/1996 | Groshens |
| 5,540,976 A | 7/1996 | Shawver et al. |
| 5,545,158 A | 8/1996 | Jessup |
| 5,545,285 A | 8/1996 | Johnson |
| 5,549,964 A | 8/1996 | Shohji et al. |
| 5,569,232 A | 10/1996 | Roe et al. |
| 5,575,783 A | 11/1996 | Clear et al. |
| 5,576,090 A | 11/1996 | Suzuki |
| 5,582,668 A | 12/1996 | Kling |
| 5,591,152 A | 1/1997 | Buell et al. |
| 5,597,430 A | 1/1997 | Rasche |
| 5,626,573 A | 5/1997 | Igaue et al. |
| 5,628,856 A | 5/1997 | Dobrin et al. |
| 5,645,672 A | 7/1997 | Dobrin |
| 5,652,041 A | 7/1997 | Buerger et al. |
| 5,660,664 A | 8/1997 | Herrmann |
| 5,669,897 A | 9/1997 | Lavon et al. |
| 5,681,302 A | 10/1997 | Melbye et al. |
| 5,683,787 A | 11/1997 | Boich et al. |
| 5,690,626 A | 11/1997 | Suzuki et al. |
| 5,693,038 A | 12/1997 | Suzuki et al. |
| 5,695,849 A | 12/1997 | Shawver et al. |
| 5,709,921 A | 1/1998 | Shawver |
| 5,733,635 A | 3/1998 | Terakawa et al. |
| 5,733,822 A | 3/1998 | Gessner et al. |
| 5,735,839 A | 4/1998 | Kawaguchi et al. |
| 5,736,219 A | 4/1998 | Suehr et al. |
| 5,746,731 A | 5/1998 | Hisada |
| 5,749,865 A | 5/1998 | Yamamoto et al. |
| 5,749,866 A | 5/1998 | Roe et al. |
| 5,766,737 A | 6/1998 | Willey et al. |
| 5,769,838 A | 6/1998 | Buell et al. |
| 5,769,993 A | 6/1998 | Baldauf |
| 5,773,373 A | 6/1998 | Wynne et al. |
| 5,773,374 A | 6/1998 | Wood et al. |
| 5,788,804 A | 8/1998 | Horsting |
| 5,789,065 A | 8/1998 | Haffner et al. |
| 5,789,328 A | 8/1998 | Kurihara et al. |
| 5,804,286 A | 9/1998 | Quantrille et al. |
| 5,814,176 A | 9/1998 | Proulx |
| 5,817,087 A | 10/1998 | Takabayashi et al. |
| 5,830,203 A | 11/1998 | Suzuki et al. |
| 5,836,931 A | 11/1998 | Toyoda et al. |
| 5,836,932 A | 11/1998 | Buell et al. |
| 5,840,633 A | 11/1998 | Kurihara et al. |
| 5,864,286 A | 1/1999 | Right et al. |
| 5,876,392 A | 3/1999 | Hisada |
| 5,882,573 A | 3/1999 | Kwok et al. |
| 5,885,686 A | 3/1999 | Cederblad et al. |
| 5,899,895 A | 5/1999 | Robles et al. |
| 5,902,540 A | 5/1999 | Kwok |
| 5,904,298 A | 5/1999 | Kwok et al. |
| 5,916,206 A | 6/1999 | Otsubo et al. |
| 5,939,178 A | 8/1999 | Boich |
| 5,941,865 A | 8/1999 | Otsubo et al. |
| D414,262 S | 9/1999 | Ashton et al. |
| 5,964,973 A | 10/1999 | Heath et al. |
| 5,997,521 A | 12/1999 | Robles et al. |
| 5,997,989 A | 12/1999 | Gessner et al. |
| 6,001,460 A | 12/1999 | Morman et al. |
| 6,004,306 A | 12/1999 | Robles et al. |
| 6,013,223 A | 1/2000 | Schwarz |
| 6,048,808 A | 4/2000 | Kurihara et al. |
| 6,057,024 A | 5/2000 | Mleziva et al. |
| 6,074,505 A | 6/2000 | Ouellette et al. |
| 6,074,597 A | 6/2000 | Kwok et al. |
| 6,077,375 A | 6/2000 | Kwok |
| 6,090,234 A | 7/2000 | Barone et al. |
| 6,093,663 A | 7/2000 | Ouellette et al. |
| 6,132,411 A | 10/2000 | Huber et al. |
| 6,197,406 B1 | 3/2001 | Kwok |
| 6,200,635 B1 | 3/2001 | Kwok |

FOREIGN PATENT DOCUMENTS

| | | |
|---|---|---|
| CA | 2248575 A1 * | 4/1999 |
| DE | 3734963 A1 | 4/1988 |
| EP | 0239080 A2 | 9/1987 |
| EP | 0696655 B1 | 6/1988 |
| EP | 0 285 736 A2 | 10/1988 |
| EP | 0547497 A2 | 6/1993 |
| EP | 0548609 A1 | 6/1993 |
| EP | 0570980 A1 | 11/1993 |

| | | | | | | |
|---|---|---|---|---|---|---|
| EP | 0604731 | A1 | 7/1994 | WO | WO 92/16371 | 10/1992 |
| EP | 0617939 | A2 | 10/1994 | WO | WO 93/15247 | 8/1993 |
| EP | 0456885 | B1 | 2/1995 | WO | WO 93/15251 | 8/1993 |
| EP | 0743052 | A2 | 11/1996 | WO | WO 93/17648 | 9/1993 |
| EP | 0753292 | A2 | 1/1997 | WO | WO 94/09736 | 5/1994 |
| EP | 0547497 | B2 | 3/1997 | WO | WO 95/04182 | 2/1995 |
| EP | 0713546 | B1 | 3/1997 | WO | WO 95/16562 | 6/1995 |
| EP | 0761193 | A2 | 3/1997 | WO | WO 95/34264 | 12/1995 |
| EP | 0761194 | A2 | 3/1997 | WO | WO 96/23466 | 8/1996 |
| EP | 0763353 | A2 | 3/1997 | WO | WO 96/35402 | 11/1996 |
| EP | 0787474 | A1 | 8/1997 | WO | WO 98/14156 | 4/1998 |
| EP | 0806196 | A2 | 11/1997 | WO | WO 98/55062 | 12/1998 |
| EP | 0814189 | A1 | 12/1997 | WO | WO 99/07548 | 2/1999 |
| EP | 0835952 | A1 | 4/1998 | WO | WO 99/17926 | 4/1999 |
| EP | 0582569 | B1 | 6/1998 | WO | WO 99/48680 | 9/1999 |
| EP | 0872580 | A1 | 10/1998 | WO | WO 99/60969 | 12/1999 |
| EP | 0984083 | A2 | 3/2000 | WO | WO 99/60970 | 12/1999 |
| EP | 1013251 | A1 | 6/2000 | WO | WO 99/60971 | 12/1999 |
| EP | 0765146 | B1 | 7/2000 | WO | WO 00/19952 | 4/2000 |
| EP | 1016394 | A1 | 7/2000 | WO | WO 00/20200 | 4/2000 |
| GB | 1522767 | | 8/1978 | WO | WO 00/20202 | 4/2000 |
| GB | 2244422 | B | 3/1994 | WO | WO 00/20206 | 4/2000 |
| GB | 2253131 | B | 10/1994 | WO | WO 00/20207 | 4/2000 |
| GB | 2250921 | B | 6/1995 | WO | WO 00/37003 | 6/2000 |
| GB | 2268389 | B | 7/1996 | WO | WO 00/37005 | 6/2000 |
| JP | 54-82424 | A * | 6/1979 | | | |
| WO | WO 90/03464 | | 4/1990 | | | |
| WO | WO-92/16366 A1 * | | 10/1992 | | | |

* cited by examiner

METHOD AND APPARATUS FOR PRODUCING LAMINATED ARTICLES

The present application claims the benefit of U.S. Provisional Application Ser. No. 60/204,307 filed on May 15, 2000.

FIELD OF THE INVENTION

This invention relates to a method and apparatus for producing laminated articles from elastic and/or relatively inelastic materials. Such laminated articles may be utilized in various products requiring a certain degree of elasticity, such as diapers, garments, drapes, pads, and the like.

BACKGROUND OF THE INVENTION

Articles requiring a degree of elasticity have been formed by combining elastic materials with inelastic, or less elastic, materials through various lamination processes. Often, such composite laminate articles will be stretchable because of the presence of the elastic material and the particular manner in which the elastic and inelastic materials have been bonded together during the laminating process.

Typically, such stretchable laminates are formed by joining the inelastic material to the elastic material while the elastic material or sheet is in a stretched condition. After such joining of the materials, the laminated article is then allowed to relax, which results in the inelastic component gathering in the spaces between bonding sites on the elastic sheet. The resulting laminate article is then stretchable to the extent that the inelastic material gathered between the bond locations allows the elastic material to elongate. Examples of these types of composite laminate articles and materials are set forth in U.S. Pat. Nos. 4,720,415 and 5,385,775, each of which is incorporated herein by reference thereto.

In some stretchable laminate articles, elastic strands of continuous filaments are bonded to relatively inelastic sheet materials while the elastic strands are in a stretched condition. Such elastic continuous filaments may, in certain articles, be sandwiched between two or more relatively inelastic sheets. The relatively inelastic sheets may include nonwoven webs formed by meltblowing or spunbonding various polymers. Examples of such laminates are shown in U.S. Pat. No. 5,385,775 to Wright, which is incorporated herein in its entirety by reference thereto.

As shown in Wright, elastic continuous filaments may be extruded onto a horizontally moving sheet of material. The continuous filaments are extruded from above the horizontal plane of sheet material and directly onto the material for bonding thereto.

In other exemplary laminates, after bonding the elastic continuous filaments to the sheet material, which will often be relatively inelastic, the bonded elastic continuous filament/inelastic nonwoven sheet material will then be stretched and another relatively inelastic nonwoven sheet may be bonded to the elastic filaments. The forces that are holding the elastic continuous filaments in a stretched condition are then released to gather the inelastic nonwoven sheet(s) between the sheet bonding points. The product may then be stretched to expand and ungather the inelastic sheet(s), but will, upon release, return to the shortened, gathered state.

Such horizontally oriented processes may require expensive post-extrusion equipment in order to maintain the proper spacing between continuous filament strands. This is particularly true when the continuous filaments are not extruded as part of the laminating process and are, instead, unwound from various supply rolls. For example, when a thread such as Lycra™ is utilized, various combs and other alignment devices must be utilized in order to maintain the proper alignment between filaments as the filaments are being unwound from a typical supply spool.

Other lamination processes have also been developed for combining elastic and inelastic materials into a stretchable laminate product. For example, U.S. Pat. No. 4,910,064 to Sabee shows an apparatus for manufacturing an integral filamentary web comprising continuous filaments and meltblown fibers. A multiple number of continuous filaments are spun in curtain-like form, one side of which will have molten meltblown fibers deposited thereon and self-bonded to fix the continuous filaments in a controlled alignment. The process involves drawing continuous filaments either before, during, or after the deposition of the meltblown fibers in order to molecularly orient the continuous filaments. After stabilizing elastic continuous filaments by bonding to the meltblown fibers and relaxing the filaments, the elastic filaments and the web contract to form buckles, curls, or kinks in the non-elastic molecularly oriented permanently lengthened continuous filaments. The patent further describes the bonding of a second opposing meltblown web to the opposite side of the continuous filaments after the meltblown fiber/continuous filament composite is at least partially drawn to provide some degree of molecular orientation.

In addition, U.S. Pat. Nos. 5,200,246 and 5,219,633, also to Sabee, show a vertically-oriented process and apparatus for producing a fabric that combines elongatable continuous filaments with fibrous meltblown webs for interlocking the continuous filaments in an integrated, fibrous, continuous filament matrix. An extruder provides molten elastomeric continuous filaments which are cooled, solidified, and stretched as they are drawn from the meltblowing nozzle by counter-rotating temperature-controlled pull rolls. The solidified continuous filaments are then subsequently pulled into the nip of a pair of temperature-controlled deposition rolls whereat two opposing meltblown gas-fiber streams or sprays are simultaneously and turbulently intermingled with each other and between the tensioned continuous elastomeric filaments. Passing the fabric between higher velocity draw rolls may then further stretch the composite fabric.

While such laminating processes are known in the art, improvements to the processes that allow for more efficient laminate formation are needed. The present invention addresses some of the drawbacks and deficiencies of present elastic/less elastic laminating systems.

SUMMARY OF THE INVENTION

The present invention provides a new method and apparatus for producing nonwoven laminates in a vertical, instead of a horizontal, plane. In the present vertical filament lamination process, an extruder supplies strands of elastic continuous filaments to the lamination process. In some embodiments, the continuous filaments are provided to a series of various rollers maintained in a vertical "s-shaped" arrangement. In certain embodiments, the extruder output is located in a canted or angled position with respect to the vertical flowpath plane so that the continuous filaments meet the first roller at a predetermined angle. The rollers are positioned and operated so as to cause the continuous filaments to be stretched as they vertically flow through the bank of rollers towards a bonding station. In addition, one or more of the rollers may be chilled so as to simultaneously quench the continuous filaments as they are being stretched.

After stretching, the continuous filaments are then conveyed into position at a bonding station so that a facing of a non-elastic, less-elastic, more elastic, or identically-elastic, sheet material may be bonded to the continuous filaments. Typically, this bonding will require the application of an adhesive to the facing in order to bond the stretched continuous filaments to the facing. In certain embodiments, a second facing may be bonded to the other unattached surface of the stretched continuous filaments so as to achieve a stretchable article wherein the continuous filaments are sandwiched between at least two outer facings.

After bonding of the facing(s), the continuous filaments are allowed to relax and contract to an unstretched, or less stretched, condition. The contraction of the continuous filaments results in a gathered, stretchable laminate article.

In certain embodiments, the continuous filaments may be relatively inelastic. In such embodiments, the resultant gathering is not realized to the extent realized with highly elastic continuous filaments.

The process, which has a vertical flow, allows for several benefits over prior horizontal flow processes, as well as prior vertical processes. For example, because the continuous filaments are being extruded in a vertical direction that is approximately in line with the vertical flow of the entire lamination process, automatic re-threading of filaments when they are broken or interrupted in their travel downward may be achieved. In addition, when utilized, the series of rollers are arranged so as to provide the predetermined stretching characteristics to the continuous filaments.

The number of separate rollers used to convey the continuous filaments to the bonding location may vary depending on the particular attributes desired in the final product. In one particular embodiment, at least four rollers—a first chilled positioning roller, a second chilled roller, a third unchilled roller, and a fourth unchilled roller—may be utilized. In this embodiment, the fourth roller may operate at a speed of between about 4 and about 10 times the speed of the first chilled roller in order to achieve the desired stretching of the continuous filaments. Other embodiments, on the other hand, may utilize only one chilled roller before providing the continuous filaments to the nip where the facing (s) are bonded thereto.

As described above, the continuous filaments may be extruded so as to supply the filaments to the first chilled roller at an angle relative to the vertical axis of the roller bank. This angle may be varied depending on the particular attributes desired and the processing conditions. Angles such as about 20°, about 35°, or about 45° from vertical may be utilized.

Other objects, advantages and applications of the present invention will be made clear by the following detailed description of embodiments of the invention and the accompanying drawings wherein reference numerals refer to like or equivalent structures.

DETAILED DESCRIPTION OF THE INVENTION

Figure 1:
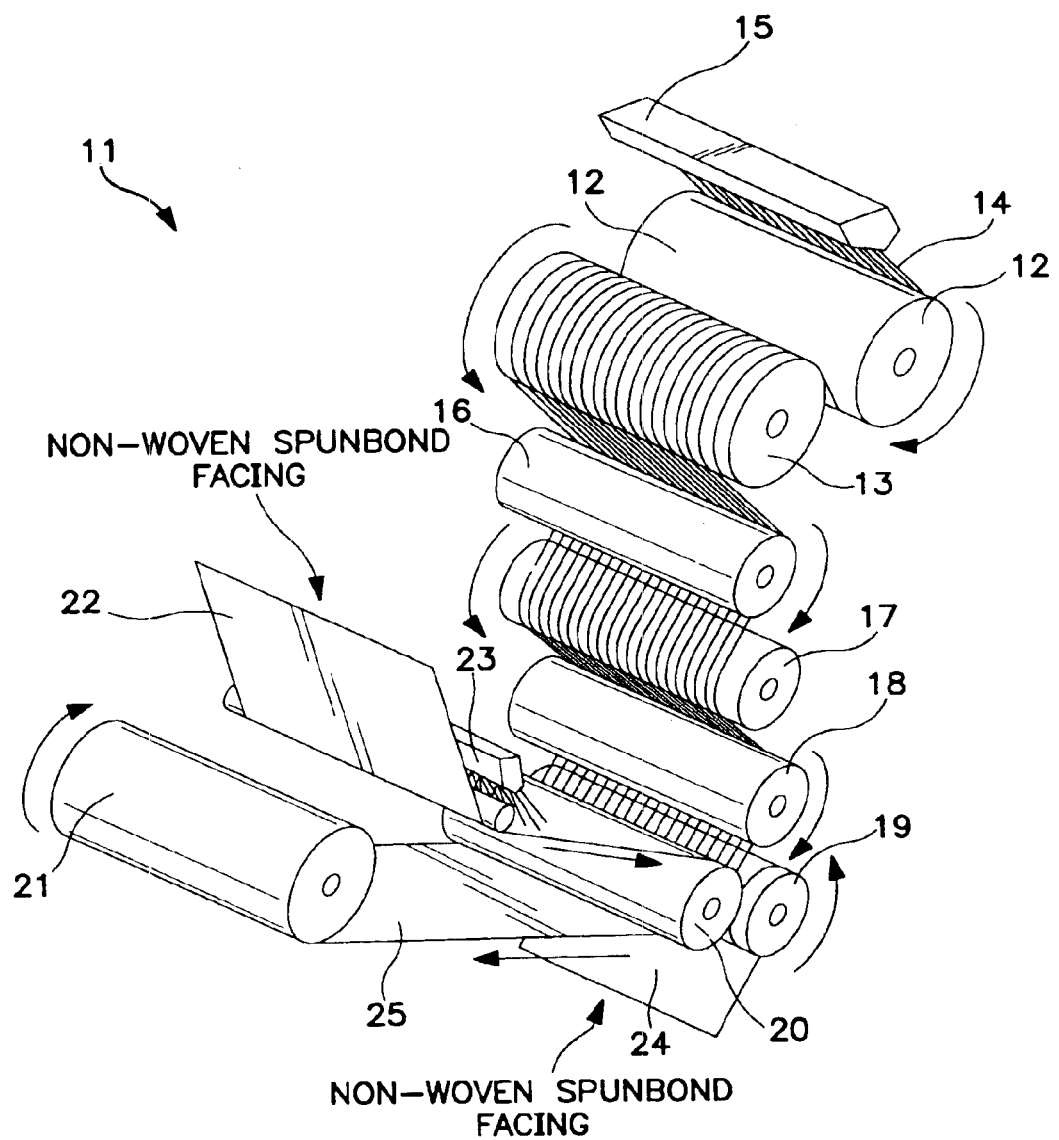
FIG. 1 is a perspective view of a vertical filament laminating (VFL) system of this invention.

Reference now will be made to the embodiments of the invention, one or more examples of which are set forth below. Each example is provided by way of explanation of the invention, not as a limitation of the invention. In fact, it will be apparent to those skilled in the art that various modifications and variations can be made in this invention without departing from the scope or spirit of the invention. For instance, features illustrated or described as part of one embodiment can be used on another embodiment to yield a still further embodiment. Thus, it is intended that the present invention cover such modifications and variations as come within the scope of the appended claims and their equivalents. Other objects, features and aspects of the present invention are disclosed in or are obvious from the following detailed description. It is to be understood by one of ordinary skill in the art that the present discussion is a description of exemplary embodiments only, and is not intended as limiting the broader aspects of the present invention, which broader aspects are embodied in the exemplary constructions.

The presently described vertical filament laminating system produces stretchable laminate articles that can be utilized in a variety of applications such as in diapers and other products requiring a certain degree of elasticity. As described above, the VFL system has certain advantages over previously described horizontally flowing systems.

The term "continuous filaments", as used herein, refers to strands of continuously formed polymeric filaments. Such filaments will typically be formed by extruding molten material through a die head having a certain type and arrangement of capillary holes therein.

The term "elastic" or "elasticized", as used herein, refers to a material which, upon application of a biasing force, is stretchable, which is elongatable to at least about 60 percent (i.e., to a stretched, biased length which is at least about 160 percent of its relaxed unbiased length), and which will recover at least 55 percent of its elongation upon release of the stretching force. A hypothetical example of an elastic material would be a one (1) inch sample of a material which is elongatable to at least 1.60 inches and which, when released, will recover to a length of not more than 1.27 inches. Many elastic materials may be elongated by more than 60 percent (i.e., more than 160 percent of their relaxed length). For example, some elastic material may be elongated 100 percent or more, and many of these will recover to substantially their initial relaxed length such as, for example, within 105 percent of their original relaxed length upon release of the stretching force.

As used herein, the term "polymer" generally includes, but is not limited to, homopolymers, copolymers, such as, for example, block, graft, random and alternating copolymers, terpolymers, etc. and blends and modifications thereof. Furthermore, the term "polymer" includes all possible geometrical configurations of the material, such as isotactic, syndiotactic and random symmetries.

The term "composite nonwoven fabric", "composite nonwoven", "laminate", or "nonwoven laminate", as used herein, unless otherwise defined, refers to a material having at least one elastic material joined to at least one sheet material. In most embodiments such laminates or composite fabric will have a gatherable layer which is bonded to an elastic layer or material so that the gatherable layer may be gathered between bonding locations. As set forth herein, the composite elastic laminate may be stretched to the extent that the gatherable material gathered between the bond locations allows the elastic material to elongate. This type of composite elastic laminate is disclosed, for example, in U.S. Pat. No. 4,720,415 to Vander Wielen et al., which is incorporated herein in its entirety by reference thereto.

As used herein, the term "nonwoven web" refers to a web having a structure of individual fibers or threads that are interlaid, but not in an identifiable, repeating manner. Nonwoven webs have been, in the past, formed by a variety of processes such as, for example, meltblowing processes, spunbonding processes and bonded carded web processes.

As used herein, the term "meltblown fibers" means fibers formed by extruding a molten thermoplastic material through a plurality of fine, usually circular, die capillaries as molten thermoplastic material or filaments into a high velocity gas (e.g. air) stream which attenuates the filaments of molten thermoplastic material to reduce their diameter, which may be to microfiber diameter. Thereafter, the melt-blown fibers are carried by the high velocity gas stream and are deposited on a collecting surface to form a web of randomly disbursed meltblown fibers. Such a process is disclosed, for example, U.S. Pat. No. 3,849,241 to Butin, which is incorporated herein in its entirety by reference thereto.

As used herein, the term "spunbonded fibers" refers to small diameter fibers formed by extruding a molten thermoplastic material as filaments from a plurality of fine, usually circular, capillaries of a spinerette with the diameter of the extruded filaments then being rapidly reduced as by, for example, eductive stretching or other well-known spunbonding mechanisms. The production of spun-bonded nonwoven webs is illustrated in patents such as, for example, U.S. Pat. No. 4,340,563 to Appel et al., and U.S. Pat. No. 3,692,618 to Dorschner et al. The disclosures of these patents are incorporated herein in their entireties by reference thereto.

The presently described vertical filament laminator system produces a stretchable laminate by use of a vertically oriented process as opposed to the horizontally oriented process described, for example, in Wright. Specifically, the present process employs an extruder for supplying a number of strands of elastic continuous filaments to form the stretchable component of the present laminate. The actual number of continuous filaments utilized in forming the composite fabric may be varied depending on the particular characteristics desired in the final product. For example, as many as 215 separate strands, and in many cases more than 100 strands, per width of material (and up to as many as 2600 strands total, or more) may be utilized.

The die of the extruder may be positioned with respect to the first roller so that the continuous filaments meet this first roller at a predetermined angle. This strand extrusion geometry is particularly advantageous for depositing a melt extrudate onto a rotating roll or drum. An angled, or canted, orientation provides an opportunity for the filaments to emerge from the die at an angle to the roll tangent point resulting in improved spinning, more efficient energy transfer, and generally longer die life. This improved configuration allows the filaments to emerge from the die and follow a relatively straight path to contact the tangent point on the roll surface. The angle between the die exit of the extruder and the vertical axis (or the horizontal axis of the first roller, depending on which angle is measured) may be as little as a few degrees or as much as 90°. For example, a 90° extrudate exit to roller angle could be achieved by positioning the extruder directly above the downstream edge of the first roller and having a side exit die tip on the extruder. Moreover, angles such as about 20°, about 35°, or about 45° away from vertical may be utilized. It has been found that, when utilizing a 12-filament/inch spinplate hole density as explained below, an approximately 45° angle allows the system to operate effectively. The optimum angle, however, will vary as a function of extrudate exit velocity, roller speed, vertical distance from the die to the roller, and horizontal distance from the die centerline to the top dead center of the roller. Optimal performance can be achieved by employing various geometries to result in improved spinning efficiency and reduced filament breakage. In many cases, this results in potentially increased roll wrap resulting in more efficient energy transfer and longer die life due to reduced drag and shear of the extrudate as it leaves the capillaries of the extruder die and proceeds to the chilled roll.

The rollers that carry the continuous filaments are positioned and operated so as to cause the continuous filaments to be stretched as they vertically flow through the lamination system. When a number of rollers are employed, each successive roller turns in a direction opposite to the immediately preceding roller so that the strands of continuous filaments are handed off from roller to roller. In addition, the speed of each successive roller may be varied from the preceding roller so as to obtain the desired stretching and elongation characteristics. For example, any particular roller may operate at between 1 to 10 times, and more, the speed of any preceding roller. Typically, a separate controller, such as a servomotor or a Turner drive, may be utilized to allow individual speed control for each roll and will drive each individual roll. When the speed is varied, successive rollers may turn at a faster rate to stretch or elongate the strands as they move downwardly in the vertical process. In addition, the continuous filaments are ultimately reduced to a fiber size of approximately 0.008 to 0.040 inches in diameter, and in some cases to approximately 0.015 to 0.020 inches in diameter.

The number of separate rollers used to convey the continuous filaments to the bonding location may vary depending on the particular attributes desired in the final product. In one particular embodiment, at least four rollers—a first chilled (or positioning) roller, a second chilled roller, a third unchilled roller, and a fourth unchilled roller—may be utilized. In another embodiment, only two chilled rollers may be needed before the continuous filaments are supplied to the laminator portion of the system which bonds the spunbond facing(s) to the continuous filaments in a roller nip.

In certain embodiments, the rollers may be plasma coated to provide good release properties. In other embodiments, the rollers may additionally be grooved or channeled to ensure that the extruded continuous filaments maintain a proper separation between individual filaments as the filaments pass over the surface of the rolls and flow through the system. In some embodiments, smooth rolls maybe used for one or all of the rolls. In the case where plasma-coated rolls are employed, the continuous filaments will not slip as much as they do on smooth, uncoated rolls. The plasma-coatings grips the strands and promote increased uniformity of distances between the continuous filament strands.

As suggested, any or all of the rollers may be chilled so as to more quickly quench, or harden, the continuous filaments as they are proceeding through the process. The chilled rolls may be chilled to a controlled temperature of between about 45° F. and about 60° F. (typically about 45° F. or about 50° F. Simultaneous quenching and stretching may be optimized depending on the particular stretchability characteristics desired in the final product.

In one particular embodiment, the series of rollers (or roller) may be enclosed within a sealed tower structure and conditioned air, with the moisture removed, may be utilized in order to control the chilling effects of the rollers. For example, the chilled rolls may be chilled to 50° F. or less relative to the controlled dewpoint. In such cases, the temperature to which the rolls are chilled may be significantly less than 50° F., but with the conditioned air environment, the rolls may remain at 50° F.

Other various mechanisms may be utilized to quench the continuous filaments. For example, external air could be forced onto the fibers in order to control the hardening of the fibers. In other embodiments, one large roll could be used with sufficient surface area in order to quench the fibers.

After passing through the series of rollers and becoming stretched, the continuous filaments are then conveyed into a position so that a sheet material may be bonded to the continuous filaments at a laminator section. In certain embodiments, this sheet material will be less elastic than the continuous filaments. The sheet material may be various meltblown nonwoven webs, spunbond nonwoven webs, carded webs, or even woven webs. Certain enhanced properties and production efficiencies, however, arise from the use of polymeric spunbond nonwoven webs. In one particular embodiment, a polypropylene spunbond facing having a basis weight of approximately 0.4 ounces per square yard ("osy") may be employed.

Bonding may be achieved either autogenously or through the use of a separate adhesive or as a combination of autogenous and adhesive bonding. Typically, the process will have sufficiently quenched the continuous filaments by the time they arrive at the bonding station so that autogenous (or bonding without adhesive) alone would not be possible. Therefore, in most embodiments, an adhesive, such as a melt-spray type adhesive, is employed. Although, as explained below, if sufficient tackifying resins, or other adhesive components, are utilized either in the facings or in the continuous filaments, then autogenous bonding might be possible.

In certain embodiments, the adhesive is sprayed directly onto the sheet material to be bonded to the continuous filaments. However, other arrangements of adhesive application, such as brushing or the like, may also be utilized. In addition, the adhesive may be applied directly to the sheet material prior to bonding with the continuous filaments, may be applied to both the continuous filaments and the sheet material prior to bonding, or may be applied to one or both of the filaments and the sheet material while bonding pressure is being applied. The present invention is not limited to any particular bonding mechanism.

Particular meltspray adhesives that may be utilized include Findley-brand H2525A and Findley-brand H2096, both available from Findley Adhesives (known also as Bostik Findley). These adhesives may be applied through a hot melt spray die at an elevated temperature of approximately 300–375° F. to the inner surface of the facing. The meltspray adhesive usually will form a very lightweight layer of about 3 grams per square meter ("gsm") of adhesive in the final composite. These particular Findley adhesives are elastic as well.

The system employs nip rolls to apply pressure to the adhesive-coating facing and the continuous filaments to result in the necessary lamination. The outer facing is bonded together with the continuous filaments at a fairly high surface pressure, which may be between about 20 and 300 pounds per linear inch ("pli"). A typical bonding pressure may be about 50 pli or about 100 pli.

The bonder, or nip roll, (sometimes referred to as "laminator") section of the laminating apparatus performs the primary stretching on the continuous filaments. The speed ratio of the bonder or nip rolls relative to the chilled rolls can be varied, and in most cases is between about 2:1 and 8:1 and in some is approximately 4:1 to 6:1.

As an alternative, the elastic strands may be bonded to a polymeric web prior to stretching so that the strands can be handled in a single sheet form. In this embodiment, a tackified meltblown web may be applied onto a set of parallel elastic filaments. The web/strand sheet will be stretched and then fed into a calender nip so as to bond facings to the sheet with the use of an adhesive system. When utilized, this particular embodiment allows for occasional filament breakage or imperfection without interrupting the manufacturing process.

In certain embodiments, one or more additional facings may be bonded to the other unattached surface of the stretched continuous filaments so as to achieve a stretchable article wherein the continuous filaments are sandwiched between at least two outer facings. Again, the particular bonding mechanism and method is not limited by the teachings of the present invention. In many instances, merely applying a spray adhesive to one surface of one outer facing, and then contacting the adhesive-carrying facing with the stretched continuous filaments and with a second outer facing will result in sufficient bonding strength for a two-facing/continuous filament laminate product.

After bonding of the facing(s) to the continuous filaments to form a spunbond/elastomeric continuous filament/spunbond laminate, the laminate is then allowed to relax and contract to an unstretched or less stretched, condition. The laminate is then wound onto a take-up roll via a surface driven winder. The speed ratio of the winder relative to the bonder rollers results in relaxation of the stretched continuous filaments and a retraction of the laminate into a gathered state as the laminate is wound onto the roll. For example, the winder speed to bonder roll speed may be approximately 0.3 to about 1.0, and may be from about 0.5 to 1.0. The contraction of the continuous filaments results in a gathered, stretchable laminate article where the outer facing(s) is gathered between the bonding points.

The overall basis weight of the laminate can vary, but in some applications is between about 2 and about 4 ounces per square yard ("oz/yd$^2$"). In one particular embodiment, the basis weight is between about 2.85 and about 3.2 oz/yd$^2$.

Various types of compositions and various processing conditions may be utilized to form the elastic continuous filaments. For example, a Kraton®-brand elastic polymer may be fed into an extruder where the polymer is melted at a controlled temperature of between about 260° and 460° F., and in certain instances at about 385° F. In other embodiments, depending on the particular polymer employed, the melt temperature may be approximately 470° F. to 480° F. The polymer is then extruded through a predetermined number of apertures in a die head in a generally downward direction into separate continuous filaments at a pressure of approximately 300 to 4000 psi (typically from about 1500 to about 2000 psi). As explained below, various die hole configurations may be utilized in the present invention.

One particular class of polymers that may be utilized in the present process is the Kraton® G series of polymers distributed by Shell Chemical Company (now available from Kraton Products U.S.-LLC). Various Kraton® polymers may be utilized.

However, the present invention is not limited to this or any particular polymer or material from which to form the continuous filaments. For example, various materials, including the following, may be used: polypropylene, polyethylene, polyesters, polyethylene terephthalate, polybutane, polymethyldentene, ethylenepropylene co-polymers, polyamides, tetrablock polymers, styrenic block copolymers, polyhexamethylene adipamide, poly-(oc-caproamide), polyhexamethylenesebacamide, polyvinyls, polystyrene, polyurethanes, thermoplastic polymers, polytrifluorochloroethylene, ethylene vinyl acetate polymers, polyetheresters, polyurethane, polyurethane elastomerics, polyamide elastomerics, polyamides, viscoelastic hot melt pressure sensitive adhesives, cotton, rayon, hemp and nylon. In addition, such materials may be utilized to extrude single-constituent, bi-constituent, and bi-component filaments within the scope of the presently described invention.

Other exemplary elastomeric materials that may be used include polyurethane elastomeric materials such as those available under the trademark ESTANE from B. F. Goodrich & Co., polyamide elastomeric materials such as those available under the trademark PEBAX from the Rilsan Company, and polyester elastomeric materials such as those available under trade designation HYTREL from E. I. DuPont De Nemours & Company.

However, the invention is not limited to only such elastomeric materials. For example, various latent elastic materials such as the Arnitel-brand polymers may be utilized to provide the necessary elasticity characteristics to the continuous filaments.

Likewise, the above-referenced materials, and others, may be utilized in forming the outer facings of the presently described laminate. In particular, various webs may be utilized that are formed from elastomeric or nonelastomeric fibers. Various polyester elastic materials are, for example, disclosed in U.S. Pat. No 4,741,949 to Morman et al., which is incorporated herein in its entirety by reference thereto. Other useful elastomeric polymers also include, for example, elastic copolymers of ethylene and at least one vinyl monomer such as, for example, vinyl acetates, unsaturated aliphatic monocarboxylic acids, and esters of such monocarboxylic acids. The elastic copolymers and formation of elastomeric fibers from these elastic copolymers are disclosed in, for example, U.S. Pat. No. 4,803,117, which is also incorporated herein in its entirety by reference thereto.

The facing(s) of the present invention may be a mixture of elastic and nonelastic fibers or particulates. For example, U.S. Pat. No. 4,209,563 is incorporated herein in its entirety by reference thereto and describes the process by which elastomeric and nonelastomeric fibers are commingled to form a single coherent web of randomly dispersed fibers. Another example of such an elastic composite web is shown in U.S. Pat. No. 4,741,949, which is also incorporated herein in its entirety by reference thereto wherein an elastic nonwoven material is described as including a mixture of meltblown thermoplastic fibers and other materials. The fibers and other materials may be combined in the forming gas stream in which the fibers are borne so that an intimate entangled commingling of fibers and other materials, e.g., wood pulp, staple fibers or particulates such as, for example, activated charcoal, clays, starches, or hydrocolloid (hydrogel) particulates, occurs prior to collection of the fibers upon a collecting device to form a coherent web of randomly dispersed fibers Various processing aids may also be added to the elastomeric polymers utilized in the present invention. For example, a polyolefin may be blended with the elastomeric polymer (e.g., the A-B-A elastomeric block copolymer) to improve the processability of the composition. The polyolefin should be one which, when so blended and subjected to an appropriate combination of elevated pressure and elevated temperature conditions, is extrudable in blended form with the elastomeric polymer. Useful blending polyolefin materials include, for example, polyethylene, polypropylene and polybutene, including ethylene copolymers, propylene copolymers and butene copolymers. A particularly useful polyethylene may be obtained from the U.S.I. Chemical Company under the trade designation Petrothene NA 601 (also referred to herein as PE NA 601 or polyethylene NA 601). Two or more of the polyolefins may be utilized. Extrudable blends of elastomeric polymers and polyolefins are disclosed in, for example, U.S. Pat. No. 4,663,220, which is incorporated herein in its entirety by reference thereto.

The elastomeric materials that are utilized to form the melt-spray adhesive and/or the elastomeric filaments may have sufficient tackiness to either allow or enhance autogenous bonding. For example, the elastomeric polymer itself may be tacky when formed into fibers and/or filaments or, alternatively, a compatible tackifying resin may be added to the extrudable elastomeric compositions described above to provide tackified elastomeric fibers and/or filaments that autogenously bond. Various known tackifying resins and tackified extrudable elastomeric compositions may be employed, such as those described in U.S. Pat. No. 4,787,699, which is incorporated herein in its entirety by reference thereto.

Any tackifier resin can be used that is compatible with the elastomeric polymer and can withstand the extrusion processing conditions. If the elastomeric polymer (e.g., A-B-A elastomeric block copolymer) is blended with processing aids such as, for example, polyolefins or extending oils, the tackifier resin should also be compatible with those processing aids. Generally, hydrogenated hydrocarbon resins exhibit enhanced temperature stability and, thus, may be desirable tackifiers. REGALREZ™ hydrocarbon and ARKON™ series tackifiers are examples of hydrogenated hydrocarbon resins. ZONATAK™ 501 lite is an example of a terpene hydrocarbon. REGALREZ™ hydrocarbon resins are available from Hercules Incorporated. ARKON™ series resins are available from Arakawa Chemical (U.S.A.) Incorporated. Of course, the present invention is not limited to use of such tackifying resins, and other tackifying resins that are compatible with the other components of the composition and that can withstand the processing conditions may also be used.

In one embodiment, the blend used to form the elastomeric continuous filaments as well as the facings include, for example, from about 40 to about 80 percent by weight elastomeric polymer, from about 5 to about 40 percent polyolefin, and from about 5 to about 40 percent resin tackifier. For example, a particular composition may include, by weight, about 61 to about 65 percent KRATON® G-1657 (in one instance, about 63 percent), about 17 to about 23 percent polyethylene NA 601-04 wax (in one instance, about 20 percent), and about 15 to about 20 percent REGALREZ™ 1126 (in one instance, about 17 percent). The G-1657 is, in particular, a styrene-ethyl butylene-styrene (S-EB-S) triblock base rubber polymer.

In another embodiment, a polymer blend consisting of approximately 85% A-B-A'-B' tetrablock base rubber polymer (sold as G1730 by Kraton Products) and 15% polyethylene NA601 wax may be employed. In this particular instance, the A and A' in the rubber polymer may be thermoplastic blocks containing a styrene moiety and B and B' may be elastomeric polymer blocks consisting of poly(ethylene-propylene).

In an additional embodiment, another polymer blend consisting of approximately 80% A-B-A'-B' tetrablock base rubber polymer, 7% polyethylene NA601 wax, and 13% REGALREZ™ 1126 tackifier may be used. As above, the A and A' in the rubber polymer may be thermoplastic blocks containing a styrene moiety and B and B' may be elastomeric polymer blocks consisting of poly(ethylene-propylene).

In another embodiment, a polymer blend consisting of approximately 70% A-B-A'-B' tetrablock base rubber polymer and 30% polyethylene NA601 wax may be utilized. As above, the A and A' in the rubber polymer may be thermoplastic blocks containing a styrene moiety and B and B' may be elastomeric polymer blocks consisting of poly(ethylene-propylene).

These various compositions may be utilized to form both the continuous filaments and the spunbond outer facing(s).

In many applications, composite materials of this type are adapted to stretch and recover in only one direction such as, for example, the machine direction whereby continuous filaments are provided in parallel as shown in the attached Figures. Thus, the elastic component of the composite may not be isotropic. That is, the elastic component need not have the same stretch and recovery properties in every direction. Desirably, the elastic component would have the required stretch and recovery properties in only the direction that the gathered inelastic material allows the composite to stretch. For example, if filaments, fibers and/or strands of an elastic material were configured in only one direction, a relatively smaller amount of elastic material could be used to provide certain levels of elastic properties, such as tension, in that one direction than if the elastic material was isotropic. Reducing the amount of elastic material in the composite reduces its cost, making such single use or limited use products such as, for example, disposable personal care products such as diapers, attractive.

Turning now to FIG. 1, an exemplary apparatus is depicted to carry out the above-described process. As shown in FIG. 1, the VFL system 11 is vertically configured. An extruder 15 is mounted for extruding continuous molten filaments 14 downward from a die at a canted angle onto chilled positioning roller 12. Chilled positioning roller 12 ensures proper alignment through the remainder of the system as it spreads the filaments. As the filaments travel over the surface of chilled positioning roller 12, they are cooled and solidified as they travel towards and over the chilled surface of first chilled roller 13. The filaments then travel downward in an "s-shaped" progression to second roller 16 and then across the surface of third roller 17, fourth roller 18 and into the nip formed by nip roller 19 and nip roller 20.

The continuous filaments may be combined at the nip with various types of facings. In the embodiment depicted in FIG. 1, a first non-woven spunbond facing 22 and a second non-woven spunbond facing 24 are combined on opposing surfaces of the continuous filaments to form a bonded laminate 25. In some embodiments, only one facing may be used, and in other embodiments it is possible to combine the elastic continuous filaments with three, four, or more layers of facing material.

Bonding of the facings to the continuous filaments typically occurs by utilizing a spray-type adhesive. A spray head 23 delivers adhesive to the surface of at least one of the non-woven spunbond facings (first spunbond facing 22 in FIG. 1) prior to compression and lamination at the nip. A second spray head which applies adhesive to another non-woven spunbond facing may be employed in some embodiments, especially for those instances for which a relatively large amount of adhesive is needed, or where larger elastic strands are present. In some embodiments, larger amounts of adhesive are needed to anchor the elastic into the non-woven spunbond.

Figure 17:
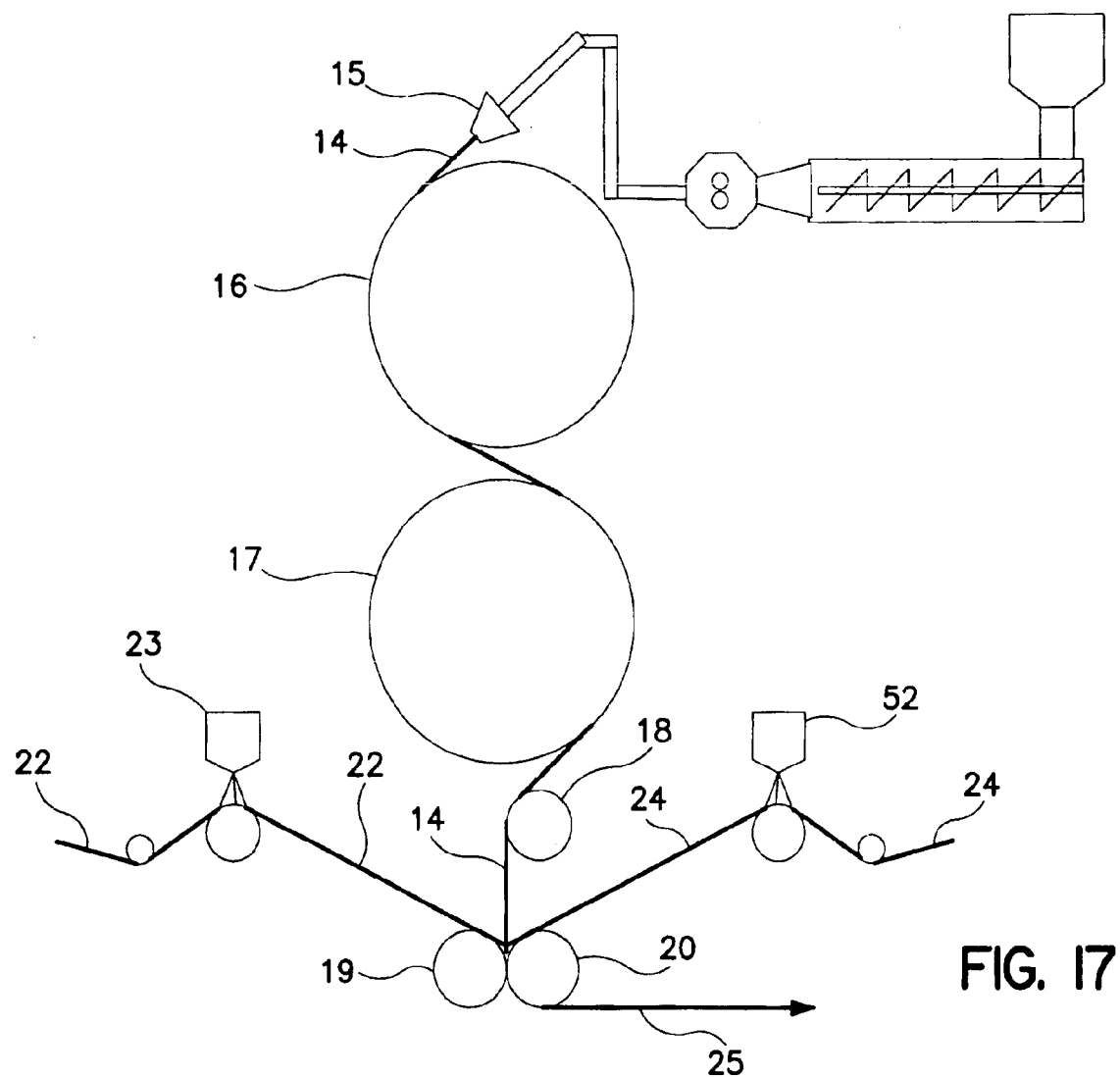
FIG. 17 illustrates another embodiment of the present invention having two melt-spray adhesive applicators.

The use of a second melt-spray adhesive application is shown in FIG. 17. In this embodiment, the additional melt-spray head 52 is employed to spray an adhesive onto the second spunbond facing 24. Some of the rollers that comprise the above-described s-wrap roll series have also been removed in the embodiment of FIG. 17 so that only three rollers are employed between extruder 15 and the nip formed by nip roller 19 and nip roller 20.

Take-up roll 21 (shown in FIG. 1) may be employed for receiving and winding the bonded spunbond/continuous filament/spunbond laminate 25 for storage.

Figure 2:
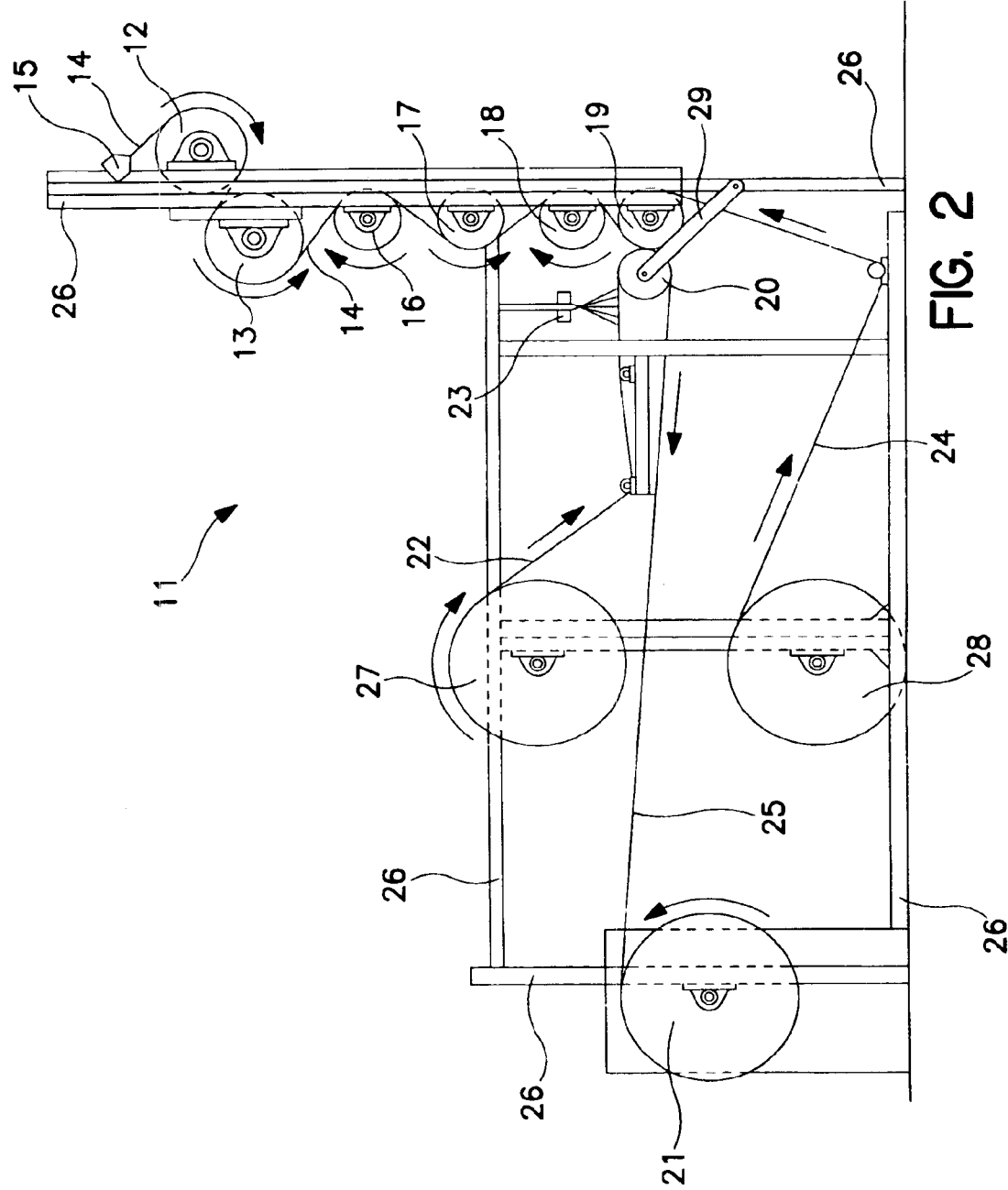
FIG. 2 is a side view of the VFL system.

FIG. 2 illustrates a side view of the VFL assembly, including support frame 26 upon which the various components of the system are secured. Reference numerals are employed throughout the Figures consistently to indicate the same components in the various views. As shown for the first time in FIG. 2, first outer facing roll 27 and second outer facing roll 28 provide the desired facings 22 and 24 to the assembly. Support strut 29 holds the nip roller 20 in place. The rollers can be seen in side view transferring the continuous filaments downward to the nip, where the filaments combine with the facings to form a bonded laminate.

In another embodiment of the present system, the aforementioned series of s-wrap rollers may be eliminated as shown in FIG. 19. In this Figure, as in FIG. 1, an exemplary apparatus is depicted in order to carry out the above-described process. The VFL system 111 is vertically configured. An extruder 115 is mounted for extruding continuous molten filaments 114 downward from a die at a canted angle onto chilled positioning roller 112. Chilled positioning roller 112 ensures proper alignment through the remainder of the system as it spreads the filaments. As the filaments travel over the surface of chilled positioning roller 112, they are cooled and solidified as they travel towards and over the chilled surface of chilled roller 113. As in other embodiments, the filaments then travel downward toward the laminator section of the system comprising a nip formed by nip roller 119 and nip roller 120, but in this instance, do so without the need for the series of s-wrap rollers described above. The continuous filaments in this embodiment may also be combined at the nip with various types of facings. In the embodiment depicted in FIG. 19, a first non-woven spunbond facing 122 and a second non-woven spunbond facing 124 are combined on opposing surfaces of the continuous filaments to form a bonded laminate 125. The spunbond facings 122 and 124 are provided to the nip by first outer facing roll 127 and second outer facing roll 128.

Bonding of the facings to the continuous filaments is accomplished in this embodiment by the use of two spray-type adhesive applicators. A spray head 123 delivers adhesive to the surface of at least one of the non-woven spunbond facings 122 prior to compression and lamination at the nip; and a second spray head 152 applies adhesive to the other non-woven spunbond facing 124.

Figure 3:
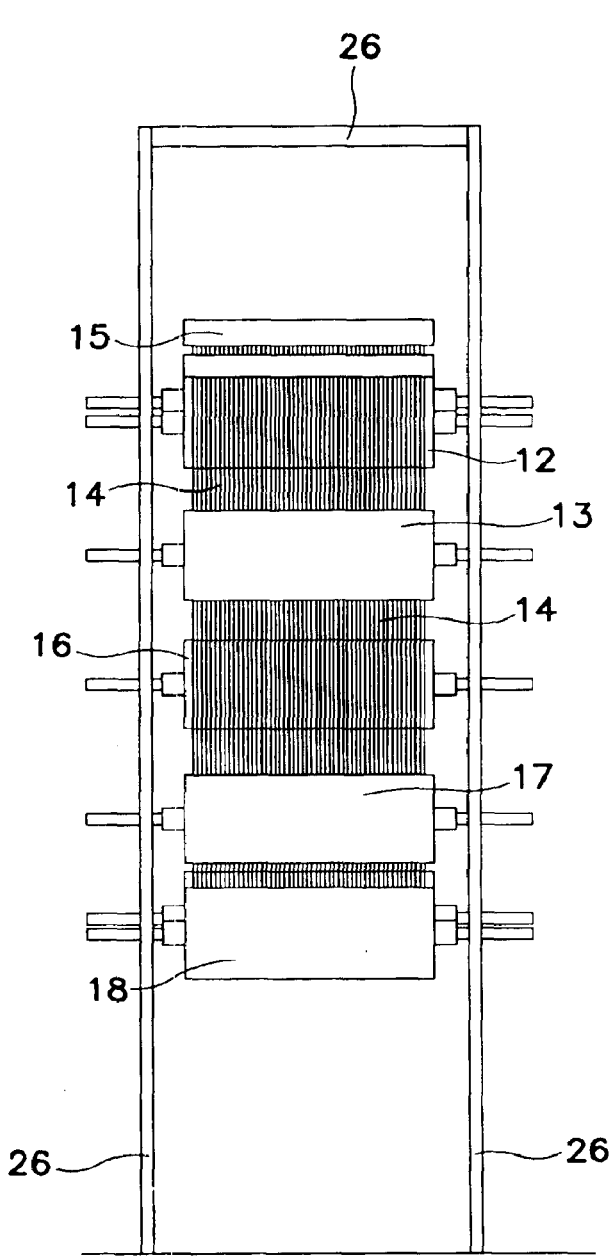
FIG. 3 is an end view of the VFL system viewed from the right hand side of FIG. 2.

In FIG. 3, an end view of the assembly of the embodiment shown in FIG. 1 showing the rollers mounted on support frame 26 is depicted. This particular embodiment employs five rollers, but other embodiments may use less or more rollers, depending upon the nature of the continuous filament elastic composition, the degree of elasticity required in the final product, the number of layers in the product, and the like.

Figure 4:
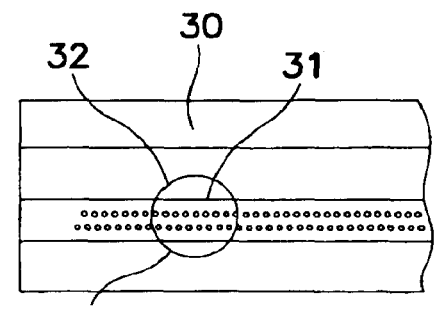
FIG. 4 is a partial view of the extrusion surface of an exemplary extruder head.
Figure 5:
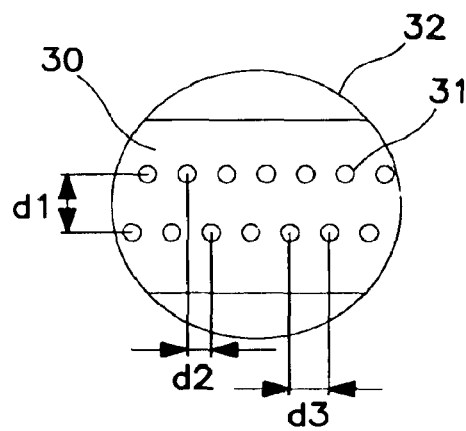
FIG. 5 is a magnified view of a portion of the surface in FIG. 4 illustrating extruder capillary apertures.

FIG. 4 depicts an exemplary extruder die head 30 with capillary holes 31. In FIG. 5, a close-up view 32 of the die head is depicted. The pattern and diameter of the capillary holes on the extruder die head may be varied to provide filaments, with the appropriate spacing, without having to utilize expensive combs, etc., to form a fabric having the correct elastic geometry. The distances d1 (distance between rows of capillary hole centers), d2 (distance between contiguous diagonal capillary hole centers on opposing rows) and d3 (distance between contiguous capillary hole centers in the same row) may be varied, depending on the particular features desired in the final products. For example, various hole densities may be utilized in the present process. In a 12-filament/inch example, the distance between center lines of the die holes (d1) may be approximately 2.12 millimeters. When a hole density of 18-filaments/inch is utilized, the distance between die hole center lines (d1) is approximately 1.41 mm.

Figure 6:
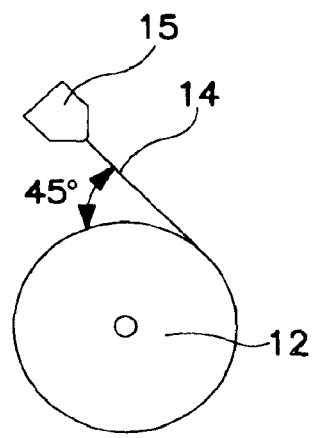
FIG. 6 is a side view depicting an exemplary position of the extruder head in relation to a roller of the present invention.

FIG. 6 illustrates a side view of the extruder 15 in a canted position relative to the vertical axis of roller 12. The 45° angle indicated on the Figure has been found to be one angle that produces an acceptable product and that allows the continuous filaments to mate with roller 12 to allow the rethreading of broken filament as described above.

Maintaining a certain roller speed allows the appropriate degree of elastic stretch to allow the puckers to form in the final laminate. The positioning chilled roller 12 normally turns at a surface speed in the range of about 3–10 feet per minute ("fpm"), while the first vertically-placed chilled roller turns at about 5 to about 15 fpm. The next roller turns at about 7 to about 18 fpm, while the last roller, when applied and used, turns at a speed of about 12 to about 100 fpm. These ranges are approximate, and can vary depending upon the conditions and final product configuration desired.

In one particular embodiment, the first chilled roll may turn at approximately 5 fpm; the second chilled roll at approximately 6 fpm; the third unchilled roll at approximately 11 fpm; and the fourth unchilled roll at approximately 26 fpm. Another embodiment utilizes a first roll speed of 10 fpm; a second roll speed of 20 fpm; a third roll speed of 40 fpm; and a fourth roll speed of 80 fpm. In this embodiment, the speed of the nip rollers is approximately 75 fpm. In a further embodiment, the speed of the first chilled roll may be approximately 400 fpm; the speed of subsequent rolls may be approximately 750 fpm to stretch the continuous filaments; the speed of the composite material being formed at the nip rollers may be approximately 1500 fpm; and the winding roller speed (to allow relaxation and, thus, gathering of the spunbond facings) may be approximately 700 fpm.

Figure 12A:
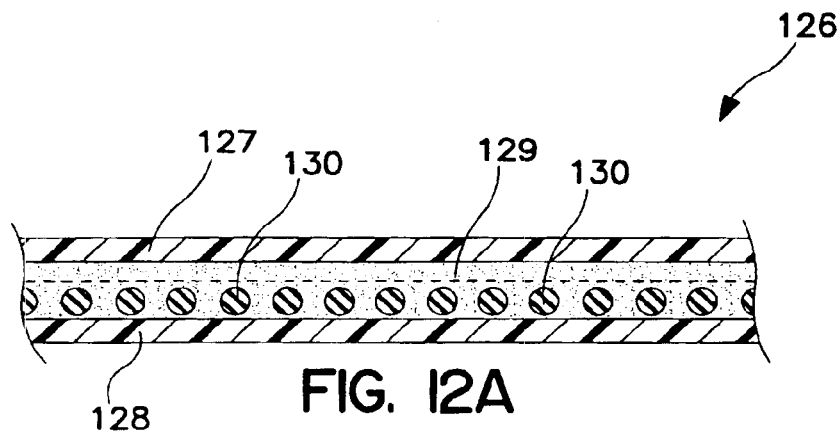
FIG. 12A shows a cross-section of a laminated article of the invention wherein one adhesive spray layer has been applied to one nonwoven facing.
Figure 12B:
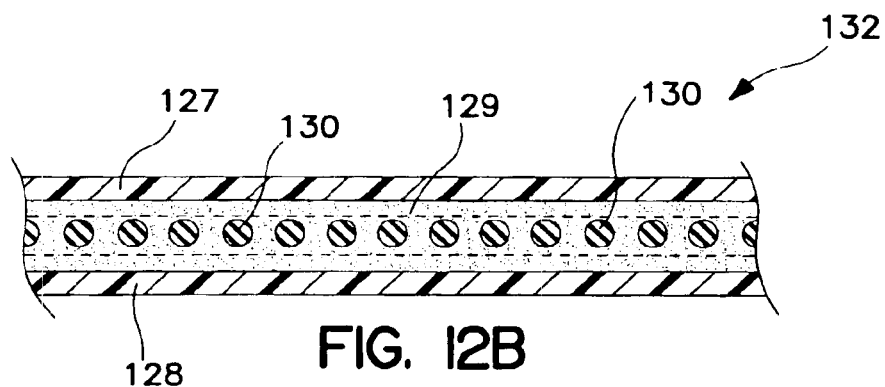
FIG. 12B depicts a cross-section of a laminated article of the invention wherein an adhesive spray layer has been applied to both nonwoven facings.

In FIG. 12A, a cross-section of a laminated article produced according to the present inventive process and apparatus is shown. The embodiment illustrated has one adhesive application that has been applied or sprayed onto the surface of only one of the nonwoven facings. A laminated article 126 is shown as having a first nonwoven facing 127 and second nonwoven facing 128. Melt-spray adhesive layer 129 is applied between the nonwoven facings, and continuous elastic filaments 130 are seen in cross-section. FIG. 12B depicts a cross-section of a laminated article 132 wherein melt-spray adhesive 129 has been applied on both nonwoven facings 127 and 128.

Figures 16A, 16B:
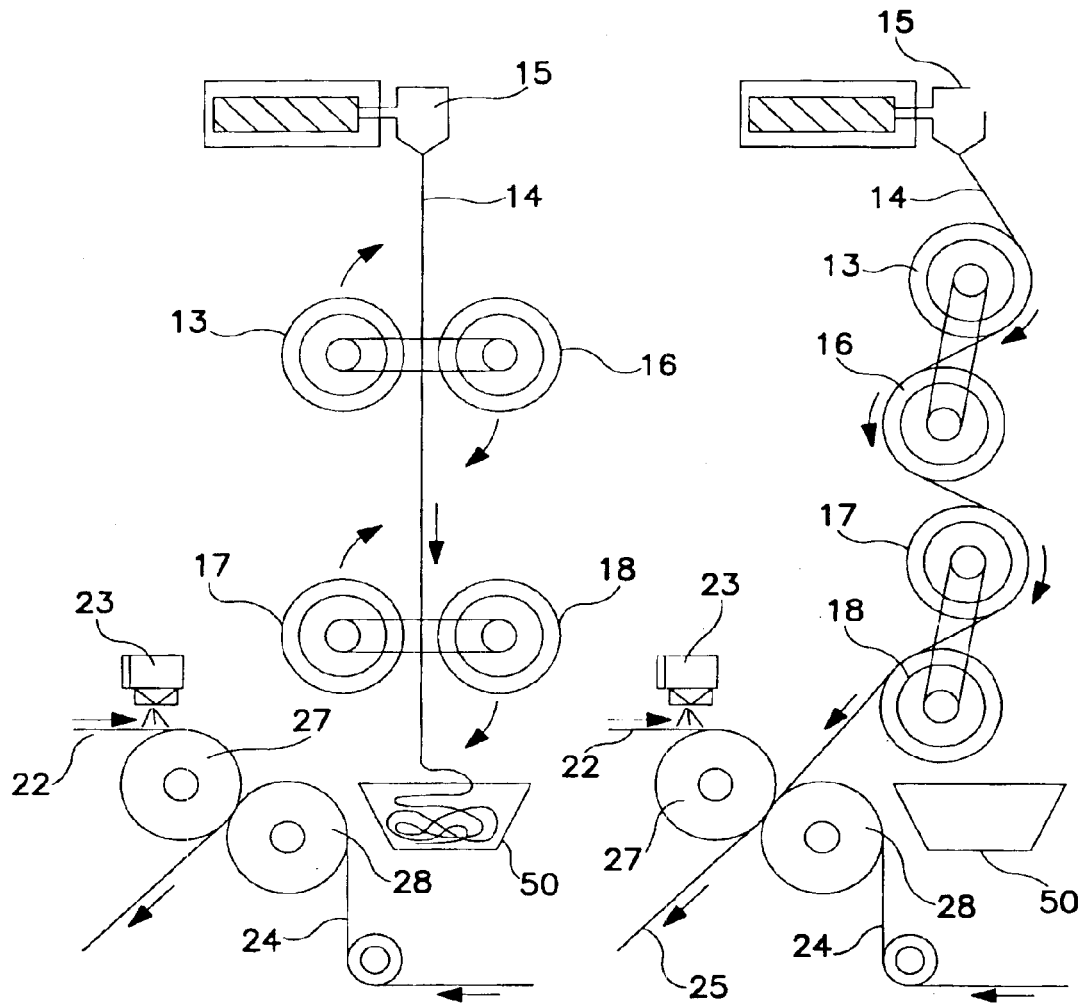
FIGS. 16A and 16B show another view of the apparatus of this invention prior to threading of the continuous filaments and after threading of the continuous filaments.

Another aspect of the present system allows the multifilament elastic strands to be self-thread into position in the vertically arranged roller assembly. This aspect is shown in related FIGS. 16A and 16B. (These Figures exemplify an embodiment that does not utilize the positioning roller 12. This roller may be omitted in certain applications, or roll 13 may actually be utilized as the positioning roller to ensure proper alignment of the continuous filaments.) Prior to being placed into vertical alignment as shown in FIG. 1, first set of connected rolls 13 and 16 (which would be operatively connected) would be in a relatively horizontal plane as shown in FIG. 16A; and second set of connected rolls 17 and 18 (which would be operatively connected) would be in a separate horizontal plane as further shown in FIG. 16B. The elastic continuous filament strands 14 would be emitted from extruder 15 in a vertical flow so that the strands would be located between each set of rolls. Because the strands are not being utilized in forming a laminate at this point, they could be caught in a waste product trough 50 for later disposal. After the strands are flowing, a mechanical mechanism (not shown), would rotate rolls 16 and 18 relative to rolls 13 and 17 approximately 90° so that the rolls would be in substantially vertical arrangement as shown in FIG. 16B. The arrows in FIG. 16A indicate the rotation directions of the rollers relative to one another. In this manner, the strands are self-threaded into the vertical roller arrangement.

In some embodiments, it is advantageous to provide fibers in the product that will consist of two polymers. Such fibers are typically known as using "bi-constituent" fibers. In one such configuration, one is allowed to select the components of fibers to be produced. For example, one may select a polymer "A" and a polymer "B" to provide a fiber blend in the final elasticized product or garment. In other embodiment, bi-component fibers (which typically have at least two separate types of fiber parts, usually in either a side-by-side or a sheath/core arrangement) might be utilized.

This invention further may provide additional methods of fabricating a die that can selectively produce individual fibers from various material sources. Relatively minor changes to the die can alter the fiber distribution to meet desired product needs. For example, mixtures of two fibers, mixtures of fiber blends, and bi-component structures can also be employed in the invention.

Figure 7:
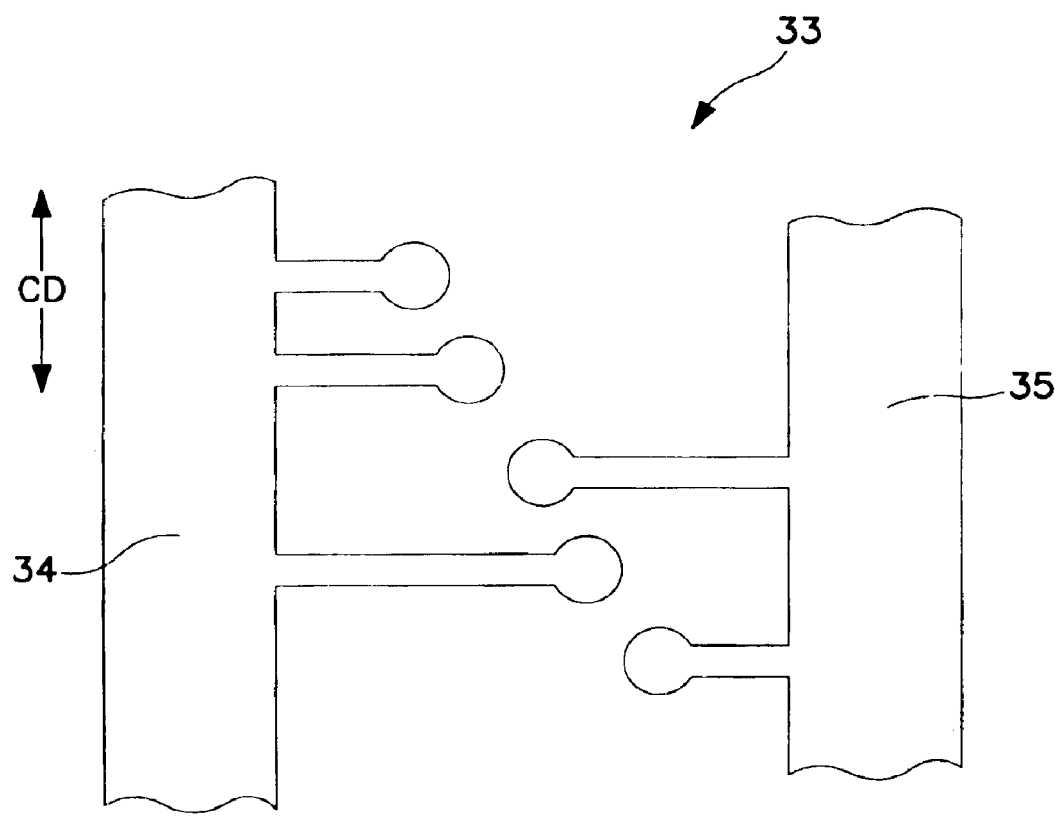
FIG. 7 is a partial side view of an exemplary apparatus for blending two polymers in a die housing.

In FIG. 7, a twin distributor section 33 is illustrated as viewed from above the distributor section which would be encased within the extruder and positioned above the capillary die entrances. The particular distributor shown is capable of distributing two polymers (i.e. "A" and "B" polymers, which do not mix) in the cross machine direction to filter screens (not shown). A left channel and a right channel are used to distribute polymer from a pipe source to a distribution passage, which runs the length of the die. The distribution unit 34 for the first polymer ("A") is shown on the left side of the FIG. 7, and the distribution unit 35 for a second, different polymer ("B") is shown on the right side of the Figure. A breaker plate supports the screens and provides a second distribution passage (not shown). Next, a plate with slots shifts the polymer from the second distribution passage to a series of holes in line with the capillaries on the spin plate or die plate. Only the desired slots are machined, as they determine the source of the material for each spin hole. In FIG. 7, five spin positions or capillary positions are shown, in the center of the Figure. The machining of the plate determines which material (i.e., either the A or the B polymer) is fed to each hole. Various configurations of die arrangements are possible, provided that the capillary arrangement extrudes the filaments so that they do not touch one another before they are cooled.

Figure 8:
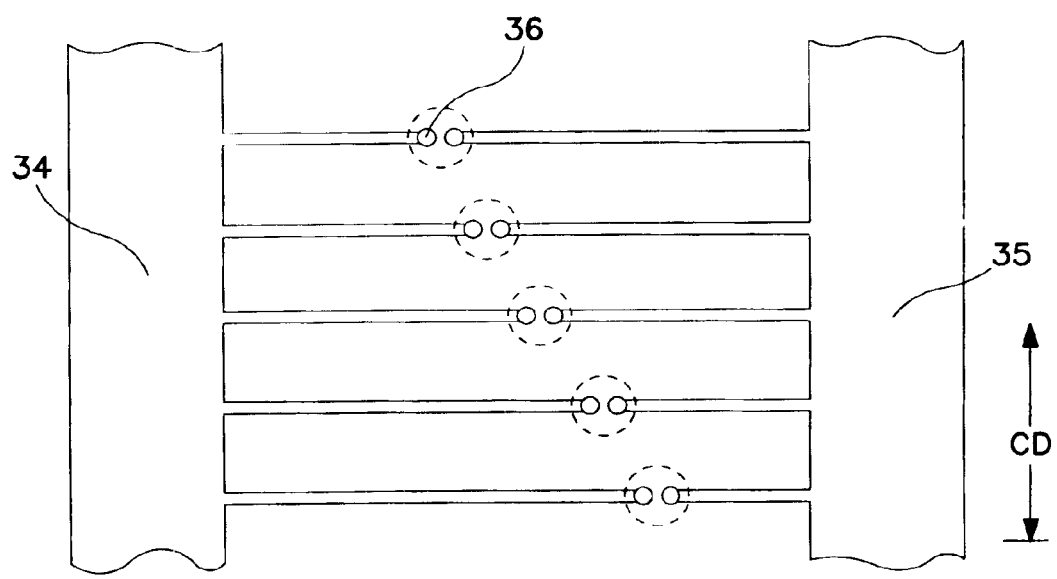
FIG. 8 is a partial side view of a further embodiment of an apparatus for blending two polymers in a die housing.

In FIG. 8, another die arrangement having a double plate set is shown. In the configuration in FIG. 8, rather than selectively machining each passage, all the passages are machined so that each spin hole or capillary hole can receive either polymer A or B (i.e. polymer from either source, left or right side of FIG. 8). Like the section in FIG. 7, this Figure illustrates a distributor viewed from above which is then, in turn, positioned above the capillary die holes (shown in phantom at reference numeral 36). Another plate is installed to block off material or allow material to pass, allowing for selectively changing polymers to be used by changing out a blocking plate. However, in the die shown in FIG. 8, the slot plate is machined so that the material is fed using individual holes over the capillary 36. A distribution plate or feed plate allows a stream of the chosen material at each capillary to proceed onward to the capillary. In some instances, it is possible to provide zone distribution control, wherein groups of fibers are provided with different polymers. In FIG. 8, a blocking plate stops the polymer from passing from the feed hole to the spin capillary below. One embodiment of this invention facilitates the control of individual fiber materials. Due to low cost and flexibility of this particular application, the hardware is typically less expensive than conventional bi-component distribution systems.

As explained above, in the absence of autogenous bonding, adhesives may be used to bond the facings to the strands, and the facings to the facings. The particular adhesive system utilized may result in a composite fabric composite with improved texture and drape. Various adhesives as discussed herein or that are otherwise available may be employed in the present system. For some products, such as a coformed stretch-bonded laminate wet wipe, the use of a high melt flow rate metallocene-catalyzed polyethylene elastomeric resin that has low tack may be advantageously utilized to provide improved texture and drape. Because of its low melting temperature, such a resin is capable of forming a physical interlock when thermally bonded. That is, the resin can penetrate into porous facings.

Dow Chemical Company resins having a relatively low density (between about 0.86 and about 0.88 g/cm$^3$) may be efficiently utilized in the adhesive system of the present invention. Other Dow resins having lower melt flow rates have also demonstrated the ability to create a physical interlock under thermal bonding conditions. The resin also could be blended with a tackifier or a lower melt flow elastomer to produce an optimized adhesive system. High melt flow elastomers may be suitable as alternate adhesive systems in the VFL process described herein.

Several patents describe various spray apparatuses and methods that may be utilized in supplying the meltspray adhesive to the outer facing(s) or, when desired, to the elastic strands themselves. For example, the following United States patents assigned to Illinois Tool Works, Inc. ("ITW") are directed to various means of spraying or meltblowing fiberized hot melt adhesive onto a substrate: U.S. Pat. Nos. 5,882,573; 5,902,540; 5,904,298. These patents are incorporated herein in their entireties by reference thereto. The types of adhesive spray equipment disclosed in the aforementioned patents are generally efficient in applying the adhesive onto the nonwoven facings in the process of this invention. In particular, ITW-brand Dynatec spray equipment, which is capable of applying about 3 gsm of adhesive at a run rate of about 1100 fpm, has been used successfully in the melt-spray adhesive applications contemplated by the present inventive process.

Figure 15A:
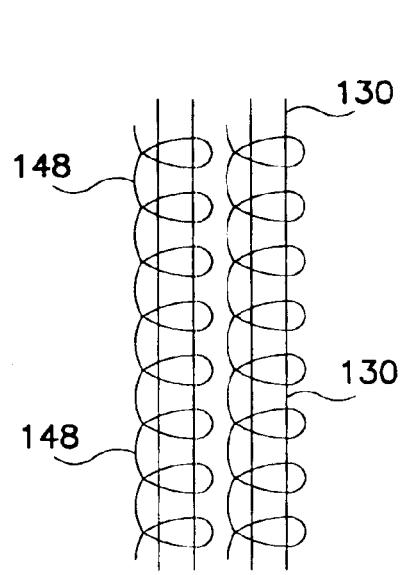
FIG. 15A shows a fourth exemplary adhesive spray pattern in a swirled-type of configuration.
Figure 15B:
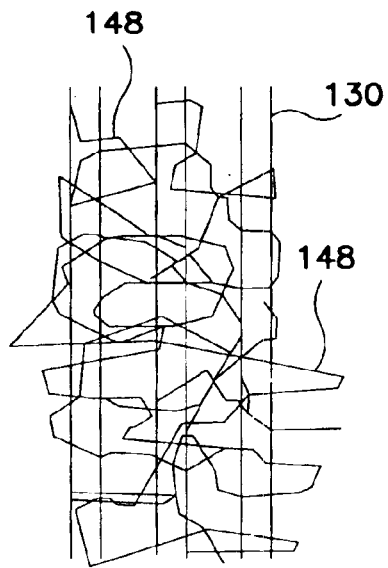
FIG. 15B shows a fifth exemplary adhesive spray pattern that is more randomized and which provides a large percentage of adhesive lines in a perpendicular orientation to the elastic filaments.
Figure 15C:
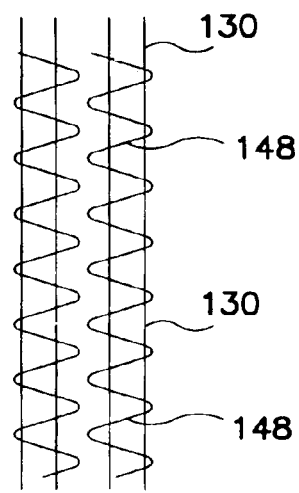
FIG. 15C illustrates a sixth exemplary adhesive spray pattern having attenuation of adhesive lines in the cross-machine direction.
Figure 15D:
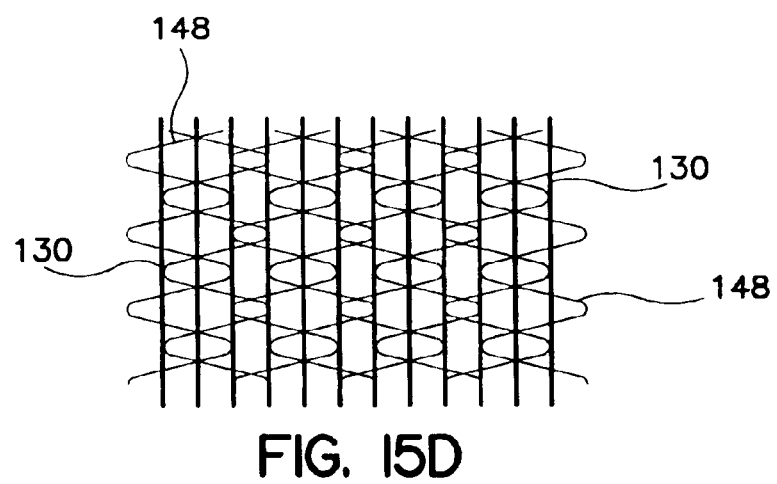
FIG. 15D shows a seventh exemplary adhesive spray pattern that resembles a "chain-link fence"

Applying an adhesive in a cross-machine pattern such as the ones shown in FIGS. 15C and 15D may result in certain adherence advantages. For example, because the elastic strands are placed in the machine direction, having the adhesive pattern orient to a large degree in the cross-machine direction provides multiple adhesives to elastic crossings per unit length.

In addition, in many particular embodiments of the present invention, the adhesive component is applied to the surface of the nonwoven layer in discreet adhesive lines. The adhesive may be applied in various patterns so that the adhesive lines intersect the elastic filament lines to form various types of bonding networks which could include either adhesive-to-elastic bonds or both adhesive-to-elastic bonds and adhesive-to-adhesive bonds. These bonding networks may include a relatively large total number of adhesive-to-elastic and adhesive-to-adhesive bonds that provide the laminated article with increased strength, while utilizing minimal amounts of adhesive. Such enhancements are achieved by the use of lay-down or spray patterns of adhesive formed by spraying adhesive onto the surface of the nonwoven in a predetermined and specific pattern. In most cases, a final product with less adhesive exhibits a reduction in undesirable stiffness, and is generally more flexible and soft than products having more adhesive.

Figure 13A:
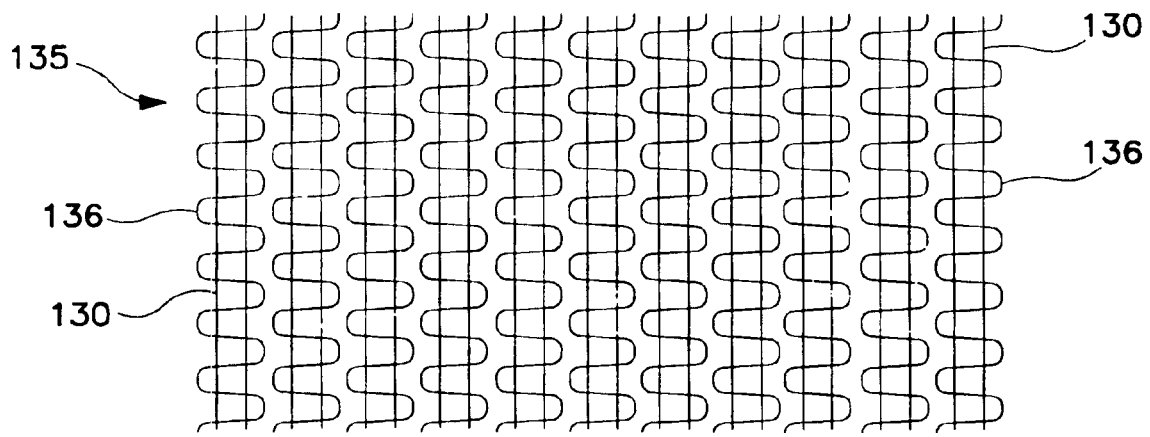
FIG. 13A shows one exemplary adhesive spray pattern in which the adhesive has been applied to the elastic filaments with attenuation in the cross direction.
Figure 13B:
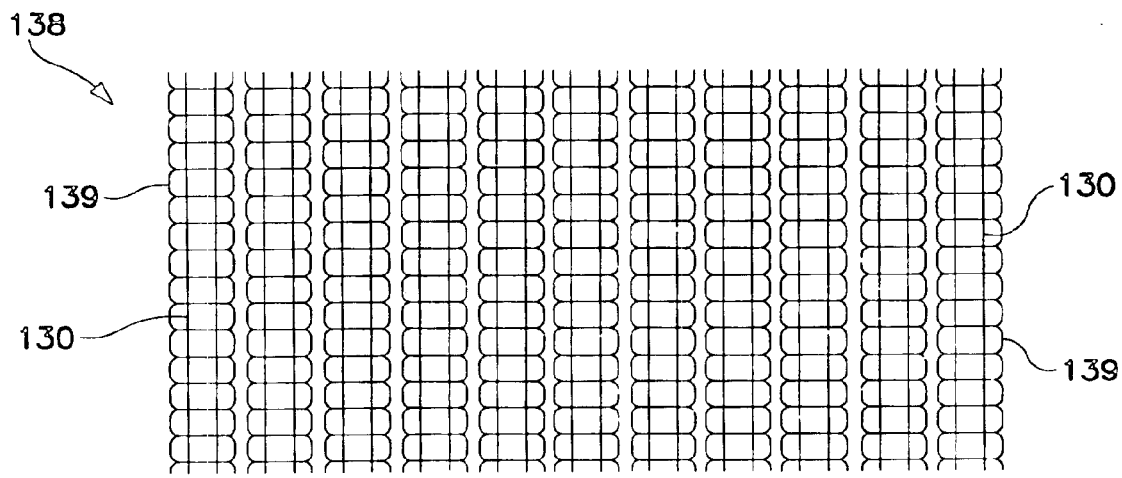
FIG. 13B shows a second exemplary adhesive spray pattern.
Figure 13C:
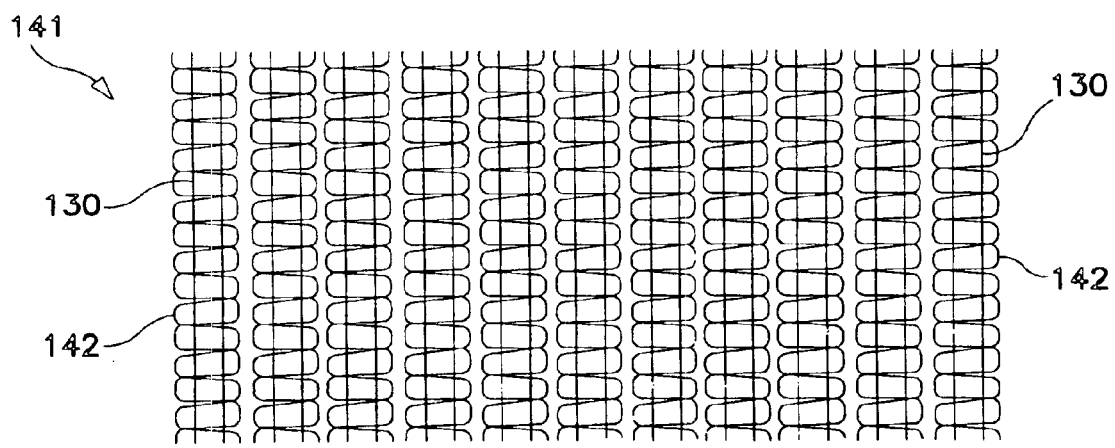
FIG. 13C illustrates a third exemplary adhesive spray pattern.
Figure 13D:
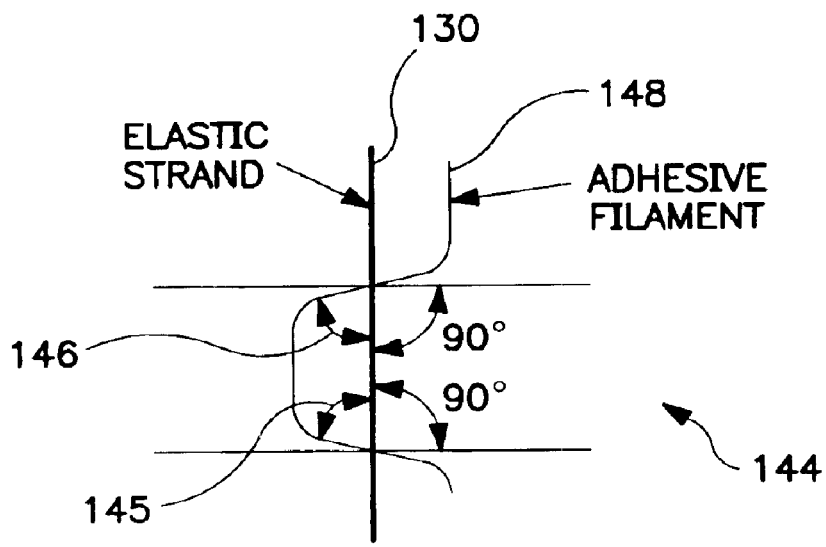
FIG. 13D shows an exemplary bond angle in one exemplary adhesive spray pattern.
Figure 14:
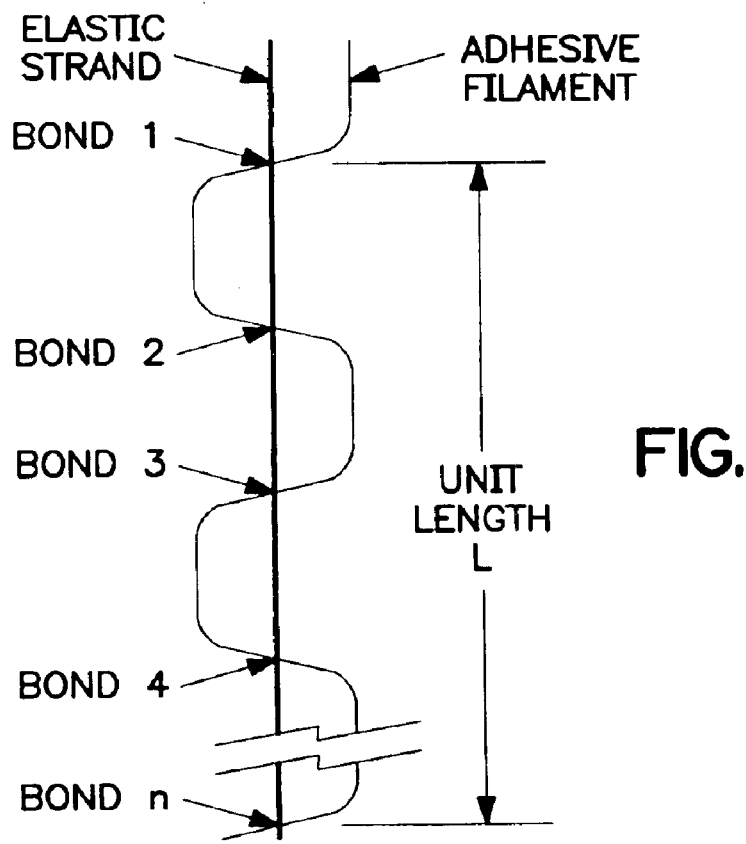
FIG. 14 illustrates the bonding pattern and method of calculating the number of bonds per unit length on elastic strands or filaments.

Applying the adhesive in a pattern so that the adhesive lines are perpendicular or nearly perpendicular to the elastic components has been found particularly advantageous. A true 90° bond angle may not be possible in practice, but an average or mean bond angle that is as great as 50° or 60° will generally produce a suitable bond between the elastic strands and the facing material. A conceptual illustration of these types of bond angles is shown in FIGS. 13D and 14. The adhesive-to-elastic bonds are formed where the lines of adhesive 148 and elastic strands 130 join or intersect.

The continuous adhesive filaments-to-elastic strand intersections are also controlled to a predetermined number of intersections per unit of elastic strand length. By having such adhesive lines in a perpendicular orientation and optimizing the number of bonds per unit of elastic strand length, the final elastic strand laminate can be produced with a minimal amount of adhesive and elastomeric strand material to provide desirable product characteristics at a lower cost.

If the adhesive-to-elastic bonds are too few in number or are too weak, then the elastic tension properties of the laminate may be compromised and the tension applied to the elastic strands may break the adhesive joints. In various known processes, the common remedy for this condition is to increase the number of bonding sites by either increasing the meltspray air pressure, or by slowing the lamination speed. As the meltspray air pressure is increased, the resulting adhesive fiber size is reduced, creating weaker bonds. Increasing the amount of adhesive used per unit area to create larger adhesive filaments can strengthen these weaker bonds, which usually increases the cost of the laminate. Lowering the lamination speed decreases machine productivity, negatively impacting product cost. The present invention, in part, utilizes an effective bonding pattern where the number of bond sites per length elastic strand are prescribed and where the adhesive-to-elastic strand joints are generally perpendicular in orientation in order to provide maximum adhesive strength. This allows the laminate to be made at minimal cost by optimizing the adhesive and elastomer content to match the product needs.

As used herein, a "scrim" refers generally to a fabric or nonwoven web of material which may be elastic or inelastic, and having a machine direction ("MD") oriented strand component along the path of product flow during manufacture and a cross-machine direction ("CD") strand component across the width of the fabric.

In addition, various other bonding techniques may be useful in the present invention. For example, adhesive may be applied in a prescribed line instead of the aforementioned melt-spray. FIG. 13A shows one exemplary adhesive line scrim pattern useful in the present invention. The adhesive line pattern has been applied to the laminate with attenuation of the adhesive lines in the cross-machine direction. Scrim pattern 135 includes adhesive lines 136 and elastic filaments 130. FIG. 13B illustrates another exemplary scrim pattern 138 having adhesive lines 139 applied to elastic strands 130. In this embodiment, it can be seen that the bond angle is very high, approaching 90° at the intersection between the adhesive and the elastic filaments. FIG. 13C illustrates another scrim pattern 141 having adhesive lines 142 and continuous elastic strands 130.

As previously discussed, FIG. 13D illustrates the relatively high bond angle that may be employed in products produced according to the present invention. In particular, lay down angle 144 is shown as the angle formed by the adhesive line 148 and the elastic strand 130. Adhesive/elastic angle 146 and adhesive/elastic angle 145 are shown as being less than 90°.

FIG. 14 utilizes an exemplary bonding pattern to conceptually illustrate the measurement for determining the number of bonds per unit length on elastic strands or filaments. FIG. 15A shows another exemplary bonding pattern having the adhesive-to-adhesive bonding wherein a swirled type of configuration is employed. FIG. 15B illustrates a more randomized pattern wherein a large percentage of adhesive lines are in a perpendicular, or almost perpendicular, orientation to the elastic filaments. FIG. 15C is another exemplary embodiment of a bonding pattern having no adhesive-to-adhesive bonds, but numerous adhesive-to-elastic strand bonds. FIG. 15D illustrates another exemplary bonding pattern that has both adhesive-to-adhesive and adhesive-to-elastic strand bonds. The configuration shown in FIG. 15D is similar to the design of a chain-link fence.

Another aspect of the invention provides for better control of the cross deckle, or cross-machine direction, basis weight variation that may be caused by stretching the elastic strands prior to lamination of the outer facings. In certain prior processes, the basis weight of the elastic strands may various across the width of the web because the filaments tend to migrate to the edges as they are stretched due to the poisson effect. In such cases, a material, when stretched in the x direction, tends to contract in the y and z directions.

The present process, in certain embodiments, may prevent such migration by correlating the necking profile of the stretched strands and the strand basis weight profile. A desired shift in the cross deckle basis weight can be determined and then adjustments may be made to the extruder die to match the desired shift. In particular, the lengths of the die capillaries can be adjusted so as to control individual filament diameters. Longer capillary holes on the edges of the die will yield thinner filaments with a reduced basis weight. As the strands are subsequently stretched and the middle filaments migrate, the as-produced uneven basis weight profile will shift into a relatively even cross-deckle basis weight profile. Such uniformity allows for more consistent roll building and converting of outside slits of material.

Figure 9:
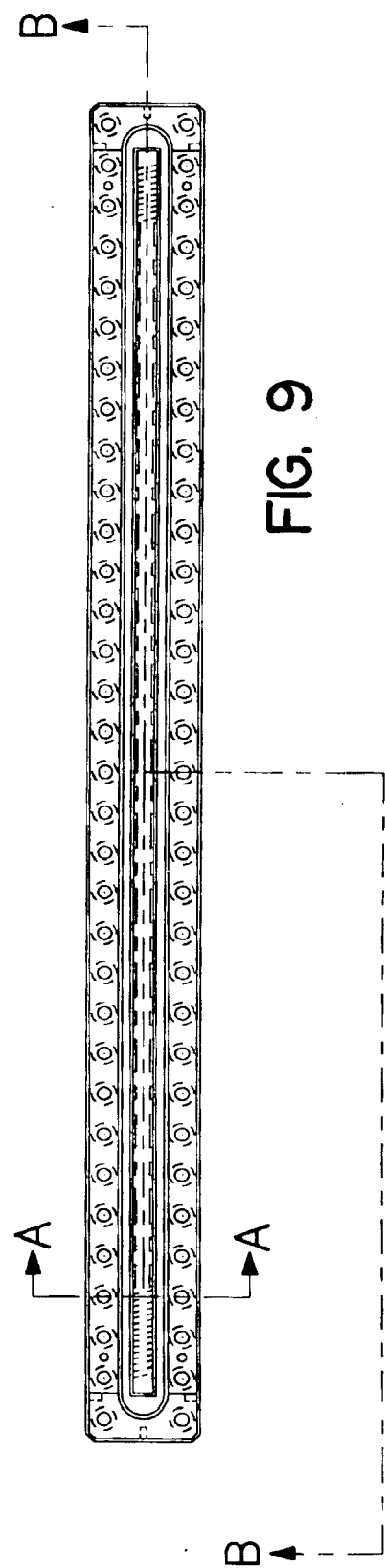
FIG. 9 is a view of the extrusion surface of an exemplary extruder head with certain capillary apertures not shown for purposes of clarity.
Figure 10:
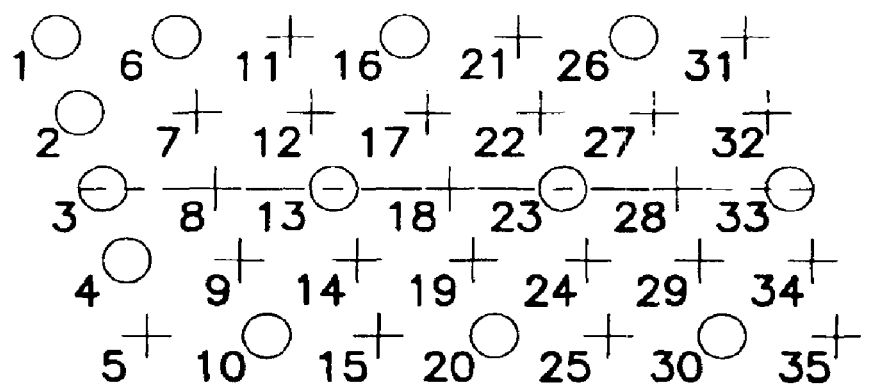
FIG. 10 is a view of an exemplary capillary aperture layout for an extruder head.
Figure 11:
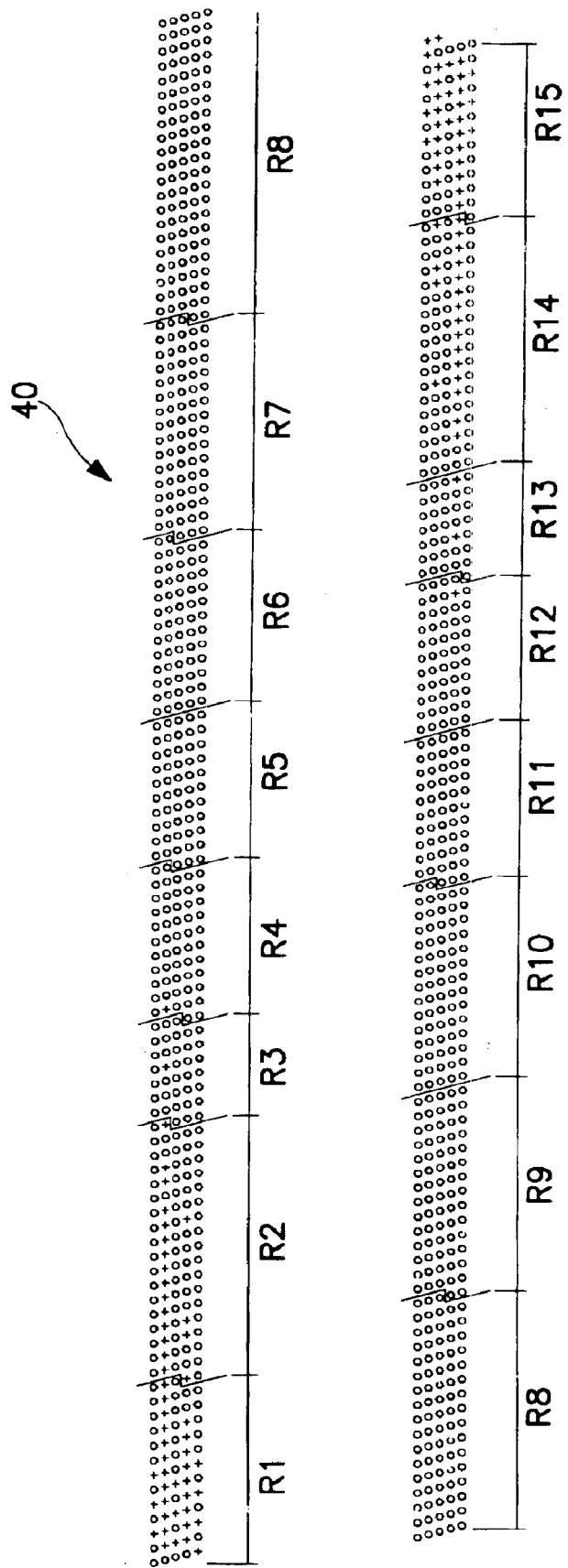
FIG. 11 is a schematic view of exemplary capillary aperture positions for an extruder head.

Although not necessary, the following die plate could be utilized in the present invention. One particular die that may be utilized in the present VFL, when desired, has 6:1 length to distance ("L/D") capillaries in the center of the die that gradually lengthen to 8:1 L/D capillaries at the edges. In FIG. 9, a representative die is shown with such a profile design. Section A—A of FIG. 9 is shown in FIG. 10. FIG. 10 also shows the detail of a capillary layout that may be utilized in the present invention. FIG. 11 shows the regions of the die that are represented by die holes. Die 40 is shown, and regions 1–15 are denoted on FIG. 11 as "R1", "R2", "R3", etc. up to and including region 15, which is denoted as "R15". Table 1 below illustrates a set of capillary drilling specifications that may be utilized in a die head of the present invention. The "Regions" in Table 1 numbered 1–15 correspond to the "R1–R15" shown in FIG. 11.

TABLE 1

| Region | Capillary Position | Capillary Positions Not Drilled | Capillary Length (inches) |
|---|---|---|---|
| 1 | 1–63 | 5 7 8 9 11 12 14 15 17 18 19 21 22 24 25 27 28 29 31 32 34 35 37 39 42 44 47 49 52 57 62 | .1891 |
| 2 | 64–152 | 64 67 72 77 79 82 84 87 92 102 107 112 117 119 122 132 137 152 | .1857 |
| 3 | 153–188 | 172 | .1823 |
| 4 | 189–242 | 192 | .1789 |
| 5 | 243–295 | — | .1755 |
| 6 | 296–367 | — | .1722 |
| 7 | 368–438 | — | .1688 |
| 8 | 439–634 | — | .1654 |
| 9 | 635–705 | — | .1688 |
| 10 | 706–777 | — | .1722 |
| 11 | 778–830 | — | .1755 |
| 12 | 831–884 | 879 | .1789 |
| 13 | 885–920 | 899 919 | .1823 |
| 14 | 921–1009 | 934 939 949 952 954 959 964 969 974 979 984 987 989 992 994 999 1004 1007 1009 | .1857 |
| 15 | 1010–1072 | 1014 1019 1022 1024 1027 1029 1032 1036 1034 1037 1039 1040 1042 1043 1044 1046 1047 1049 1050 1052 1053 1054 1056 1057 1059 1060 1062 1063 1064 1066 1071 1072 | .1891 |

The present invention may be better understood by reference to the Examples below. However, it is to be understood that the invention is not limited thereto.

EXAMPLE 1

A distinction between the products produced by the present vertical laminate process and the products produced by the aforementioned horizontal laminate process (such as disclosed in Wright), is the improved uniformity of the spacing between strands and the tension variability. For example, the average filament spacing between continuous filament strands in a laminate product formed by the present process is approximately 3 mm. On the other hand, the average filament spacing between continuous filament strands in a laminate product formed by the horizontal process disclosed in U.S. Pat. No. 5,385,775 to Wright was 4 mm to 5 mm.

EXAMPLE 2

Another characteristic of the continuous elastic filaments formed in the present process is the denier of such filaments. For examples, at 9 grams per square meter of elastic in the laminate nip during process which corresponds to 6.4 grams per die hole per minute, running at 1100 feet per minute, with a 5.2× stretch ratio and a 50% winder ratio, the denier at the first chill roll is equal to or greater than 900; the denier at the nip is equal to or greater than 173; and the denier at the winder is equal to or greater than 347.

EXAMPLE 3

At 11.5 grams per square meter of elastic in the laminate nip during process which corresponds to 8.2 grams per die hole per minute, running at 1100 feet per minute, with a 5.2× stretch ratio and a 50% winder ratio, the denier at the first chill roll is equal to or greater than 1140; the denier at the nip is equal to or greater than 220; and the denier at the winder is equal to or greater than 440.

EXAMPLE 4

Figure 18:
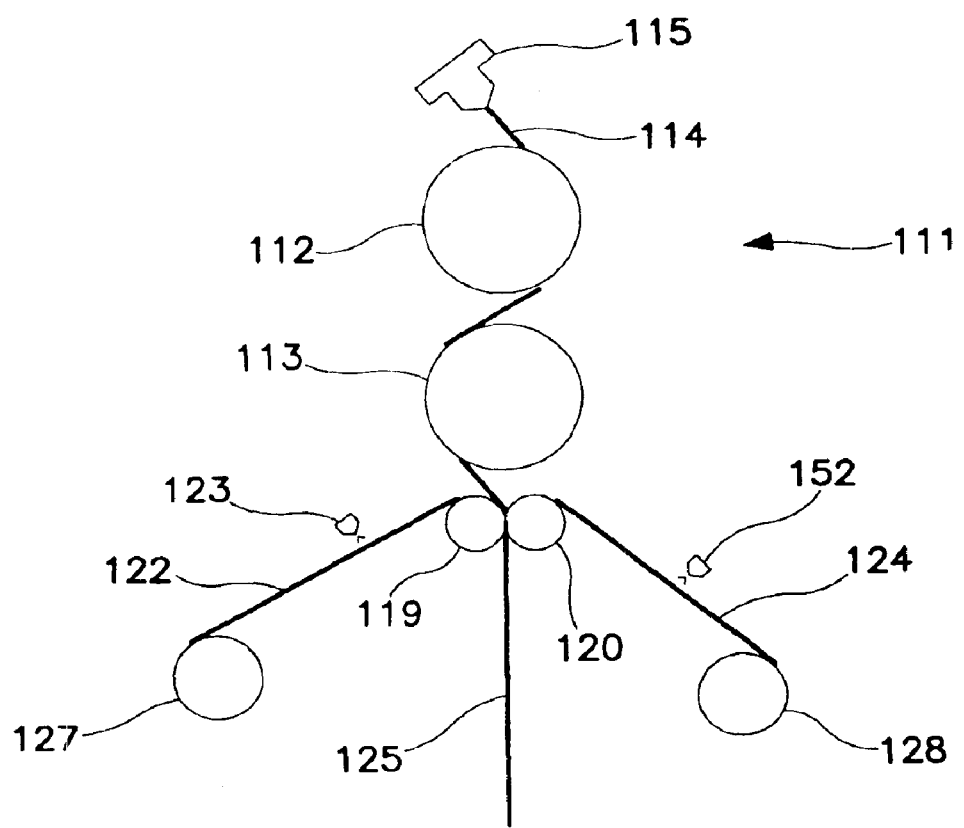
FIG. 18 is a schematic view of an alternative vertical filament laminating system of this invention.

Continuous filament strand temperatures were measured in the embodiment of the present vertical filament process shown in FIG. 18. Strand through put, chill roll speed, and contact length were varied while measuring the strand temperatures at the extrusion die exit, at the first contact point of the strand onto the first chill roll, and at the exit from the first and second chill rolls. The particular chill rolls utilized were three foot in diameter and where chilled to 50° F. with water. The rolls were plasma coated with a Newco coating PC 60531/4001F (formerly known as PC1136).

The spacing between the extrusion die and the first chill roll in this Example was 0.125 to about 6 inches, with the typical distance being about 0.75 to about 1 inch. The operating distance from the first chill roll to the second chill roll may be between 0.125 to 6 inches, with the typical distance being about 0.5 to about 1 inch. The distance from the second chill roll to the laminator nip is approximately 1 vertical inch, which corresponds to an unsupported strand length of approximately 13 inches. Of course, the distance from the second chill roll to the laminator nip could be as small as 0.125 inches or as large as 25 inches. Unsupported strand length could be as small as 2 inches or as long as 36 inches.

The table below represents the through put, speed, and contact length. Throughput ("TP") is in grams per hole per minute; the speed ("Speed") is the speed of both chill rolls in feet per minute; the contact number ("Contact") represents a level or degree of wrap of the strand around the two chill rolls (in percentage); temperatures are shown for the extruder die exit ("Die Exit"), for the point at which the continuous filaments meet the first chill roll ("Laydown"), for the point of exit from the first chill roll ("CR1 Exit"), and for the point of exit from the second chill roll ("CR2 Exit"); and the estimated strand denier ("Denier") for the strands as they meet the first chill roll.

TABLE 2

| | | | | Temperatures (° F.) | | | | |
|---|---|---|---|---|---|---|---|---|
| Sample | | Values | | Die | Lay- | CR1 | CR2 | Strand |
| # | TP | Speed | Contact | Exit | down | Exit | Exit | Denier |
| 1 | 2.3 | 170 | 0.45 | 445.2 | 405.1 | 90.3 | 63.9 | 399.49 |
| 2 | 2.3 | 170 | 0.45 | 446.6 | 409.0 | 79.0 | 61.4 | 399.49 |
| 3 | 2.3 | 170 | 0.45 | 441.8 | 408.4 | 77.9 | 64.0 | 399.49 |
| 4 | 2.3 | 75 | 0.28 | 439.9 | 401.1 | 81.1 | 63.1 | 905.51 |
| 5 | 2.3 | 75 | 0.28 | 443.4 | 408.8 | 77.4 | 63.1 | 905.51 |
| 6 | 2.3 | 75 | 0.28 | 445.2 | 402.6 | 83.3 | 60.5 | 905.51 |
| 7 | 3.8 | 170 | 0.28 | 444.8 | 412.0 | 129.4 | 85.0 | 660.03 |
| 8 | 3.8 | 170 | 0.28 | 446.0 | 415.3 | 127.1 | 80.7 | 660.03 |
| 9 | 3.8 | 170 | 0.28 | 448.1 | 409.9 | 125.4 | 91.9 | 660.03 |
| 10 | 5.2 | 170 | 0.45 | 448.9 | 415.3 | 150.6 | 74.6 | 903.20 |
| 11 | 5.2 | 170 | 0.45 | 451.0 | 413.5 | 144.4 | 83.1 | 903.20 |
| 12 | 5.2 | 170 | 0.45 | 443.8 | 413.0 | 137.0 | 80.7 | 903.20 |
| 13 | 3.8 | 75 | 0.18 | 447.6 | 428.4 | 138.3 | 82.8 | 1496.06 |
| 14 | 3.8 | 75 | 0.18 | 447.3 | 424.5 | 132.2 | 87.0 | 1496.06 |
| 15 | 3.8 | 75 | 0.18 | 445.1 | 424.4 | 131.0 | 87.0 | 1496.06 |
| 16 | 5.2 | 265 | 0.28 | 451.0 | 390.0 | 173.1 | 114.1 | 579.41 |
| 17 | 5.2 | 265 | 0.28 | 447.9 | 418.7 | 166.2 | 107.8 | 579.41 |
| 18 | 5.2 | 265 | 0.28 | 447.7 | 415.6 | 161.0 | 115.2 | 579.41 |
| 19 | 3.8 | 170 | 0.28 | 449.6 | 411.4 | 146.8 | 83.8 | 660.03 |
| 20 | 3.8 | 170 | 0.28 | 448.5 | 408.1 | 129.1 | 83.8 | 660.03 |
| 21 | 3.8 | 170 | 0.28 | 448.5 | 407.2 | 132.2 | 79.0 | 660.03 |

TABLE 2-continued

| Sample # | Values | | | Temperatures (° F.) | | | | Strand Denier |
|---|---|---|---|---|---|---|---|---|
| | TP | Speed | Contact | Die Exit | Lay-down | CR1 Exit | CR2 Exit | |
| 22 | 5.2 | 170 | 0.18 | 451.0 | 427.3 | 188.6 | 122.6 | 903.20 |
| 23 | 5.2 | 170 | 0.18 | 448.7 | 429.9 | 184.3 | 122.4 | 903.20 |
| 24 | 5.2 | 170 | 0.18 | 443.8 | 432.2 | 186.5 | 125.0 | 903.20 |
| 25 | 3.8 | 265 | 0.18 | 451.0 | 426.3 | 155.9 | 95.6 | 423.41 |
| 26 | 3.8 | 265 | 0.18 | 448.7 | 417.3 | 150.9 | 98.9 | 423.41 |
| 27 | 3.8 | 265 | 0.18 | 443.4 | 420.9 | 149.0 | 101.4 | 423.41 |
| 28 | 2.3 | 265 | 0.28 | 442.8 | 394.5 | 99.5 | 74.8 | 256.28 |
| 29 | 2.3 | 265 | 0.28 | 445.2 | 395.7 | 112.2 | 71.5 | 256.28 |
| 30 | 2.3 | 265 | 0.28 | 445.0 | 394.5 | 99.3 | 77.4 | 256.28 |
| 31 | 2.3 | 170 | 0.18 | 437.5 | 421.6 | 109.6 | 71.2 | 399.49 |
| 32 | 2.3 | 170 | 0.18 | 437.5 | 415.6 | 110.9 | 78.0 | 399.49 |
| 33 | 2.3 | 170 | 0.18 | 441.1 | 414.5 | 108.9 | 70.3 | 399.49 |
| 34 | 3.8 | 265 | 0.45 | 441.7 | 411.3 | 126.4 | 65.2 | 423.41 |
| 35 | 3.8 | 265 | 0.45 | 450.6 | 408.8 | 116.0 | 69.6 | 423.41 |
| 36 | 3.8 | 265 | 0.45 | 451.6 | 407.6 | 107.3 | 66.5 | 423.41 |
| 37 | 3.8 | 170 | 0.28 | 444.7 | 404.8 | 125.6 | 82.1 | 660.03 |
| 38 | 3.8 | 170 | 0.28 | 445.9 | 389.2 | 117.4 | 83.2 | 660.03 |
| 39 | 3.8 | 170 | 0.28 | 446.3 | 387.1 | 124.7 | 82.7 | 660.03 |
| 40 | 5.2 | 75 | 0.28 | 452.8 | 419.7 | 164.3 | 98.6 | 2047.24 |
| 41 | 5.2 | 75 | 0.28 | 451.6 | 420.7 | 168.4 | 100.5 | 2047.24 |
| 42 | 5.2 | 75 | 0.28 | 448.9 | 414.4 | 163.7 | 100.0 | 2047.24 |
| 43 | 3.8 | 75 | 0.45 | 445.5 | 414.4 | 106.6 | 58.4 | 1496.06 |
| 44 | 3.8 | 75 | 0.45 | 447.3 | 423.6 | 105.5 | 58.5 | 1496.06 |
| 45 | 3.8 | 75 | 0.45 | 446.1 | 419.0 | 106.6 | 58.7 | 1496.06 |

Although preferred embodiments of the invention have been described using specific terms, devices, and methods, such description is for illustrative purposes only. The words used are words of description rather than of limitation. It is to be understood that changes and variations may be made by those of ordinary skill in the art without departing from the spirit or the scope of the present invention, which is set forth in the following claims. In addition, it should be understood that aspects of the various embodiments may be interchanged either in whole or in part. Therefore, the spirit and scope of the appended claims should not be limited to the description of the preferred versions contained therein.

What is claimed is:

1. A method for producing a composite nonwoven fabric in a vertical plane, comprising:
   a) providing an extruder having a plurality of die heads, a vertically-arranged series of first and second chilled rollers, and a set of nip rollers, the extruder being located above the vertically-arranged series of first and second chilled rollers, the first chilled roller being positioned vertically below the extruder so that extruded filaments from the extruder flow directly to the first chilled roller, the second chilled roller being positioned vertically below the first chilled roller and located before the set of nip rollers so that the extruded continuous filaments flow directly from the first chilled roller to the second chilled roller and then directly to a nip formed by the set of nip rollers,
   b) extruding heated continuous filaments from the die heads of the extruder directly to the first chilled roller, wherein the extruder is further configured to provide the continuous filaments to the first chilled roller in a canted direction that is tangent to the surface of the first chilled roller,
   c) conveying the continuous filaments directly from the first chilled roller to the second chilled roller,
   d) quenching and stretching simultaneously the continuous filaments to form stretched continuous filaments,
   e) conveying the stretched continuous filaments directly from the second chilled roller to the nip,
   f) providing at least one nonwoven web,
   g) applying an adhesive on the surface of the one nonwoven web and then providing said one nonwoven web to the nip, and
   h) laminating the stretched continuous filaments with the nonwoven web in the nip to form a composite nonwoven fabric.

2. The method of claim 1 wherein the continuous filaments are elasticized.

3. The method of claim 1 wherein the composite nonwoven fabric is elasticized.

4. The method of claim 1 wherein the continuous filaments move vertically downward approximately in line with the lamination process.

5. The method of claim 1 wherein upon breakage of a continuous filament, the filament is automatically re-threaded.

6. The method of claim 1 comprising the further step of relaxing said composite nonwoven fabric by a take-up roll running at a differential speed.

7. The method of claim 1 comprising the further step of providing a second nonwoven web and laminating the second nonwoven web to the continuous filaments in the nip.

8. The method of claim 7 comprising the further step of applying an adhesive on the surface of the second nonwoven web prior to laminating the second nonwoven web at the nip.

9. The method of claim 1 wherein the speed ratio of the nip rolls relative to the first chilled roller can be varied.

10. The method of claim 9 wherein the speed ratio of the nip rolls relative to the first chilled roller is between about 2:1 and about 8:1.

11. The method of claim 9 wherein the speed ratio of the nip rolls relative to the first chilled roller is between about 4:1 and about 6:1.

12. An apparatus for producing a composite nonwoven fabric, comprising:
   a) an extruder having a plurality of die heads for extruding heated continuous filaments,
   b) a vertically-arranged series of first and second chilled rollers, wherein the first chilled roller is positioned vertically below the extruder so that extruded filaments from the extruder flow directly to the first chilled roller in a canted direction that is tangent to the surface of the first chilled roller and the second chilled roller is positioned vertically below the first chilled roller so that the extruded continuous filaments flow directly from the first chilled roller to the second chilled roller,
   c) a nip comprising at least two nip rollers, said nip being positioned vertically with respect to the first chilled roller in order to receive the heated continuous filaments directly from the second chilled roller,
   d) a roller mechanism for providing a first web to said nip to be laminated with the continuous filaments so as to form a continuous filament laminate, and
   e) a mechanism for carrying the continuous filament laminate away from the nip.

13. The apparatus of claim 12 further comprising an adhesive applicator for applying adhesive to the first web prior to providing the first web to the nip.

14. The apparatus of claim 13 further comprising an adhesive applicator for applying adhesive to the second web prior to providing the second web to the nip.

15. The apparatus of claim 14 wherein the adhesive applicator for the second web applies the adhesive by spraying the adhesive onto the second web.

16. The apparatus of claim 13 wherein the adhesive applicator applies the adhesive by spraying the adhesive onto the first web.

17. The apparatus of claim 12 further comprising a roller mechanism for providing a second web to said nip to be laminated with the continuous filaments and the first web so as to form a continuous filament laminate.

* * * * *